US010660072B2

(12) United States Patent
Palle et al.

(10) Patent No.: US 10,660,072 B2
(45) Date of Patent: May 19, 2020

(54) TERMINAL DEVICE AND MOBILE RADIO COMMUNICATION BY TERMINAL DEVICE

(71) Applicant: Intel IP Corporation, Santa Clara, CA (US)

(72) Inventors: Naveen Palle, San Diego, CA (US); Francois Deparis, Nuremberg (DE); Piotr Janik, Fuerth (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/661,074

(22) Filed: Mar. 18, 2015

(65) Prior Publication Data

US 2016/0278072 A1    Sep. 22, 2016

(51) Int. Cl.
*H04L 1/18* (2006.01)
*H04W 72/10* (2009.01)
(Continued)

(52) U.S. Cl.
CPC ....... *H04W 72/0413* (2013.01); *H04L 1/1867* (2013.01); *H04L 1/20* (2013.01); *H04L 5/006* (2013.01); *H04W 72/085* (2013.01); *H04W 72/10* (2013.01); *H04L 5/0055* (2013.01); *H04L 5/0064* (2013.01)

(58) Field of Classification Search
CPC ............. H04W 72/0413; H04W 72/10; H04W 72/085; H04L 1/20; H04L 1/1867; H04L 5/006; H04L 5/0064; H04L 5/0055; H04L 5/0053
See application file for complete search history.

(56) References Cited

U.S. PATENT DOCUMENTS 9,007,938 B2    4/2015 Sawai et al.
2007/0201503 A1*  8/2007 Nishio ................ H04W 52/50
370/437

(Continued)

FOREIGN PATENT DOCUMENTS

CN       102598793 A    7/2012
EP         2244514 A1   10/2010
EP         2645800 A1   10/2013

OTHER PUBLICATIONS

Mediatek, Enhanced Logical Channel Prioritization for LTE Advance, Nov. 2014, U.S. Appl. No. 62/080,635 for US 2016/0143025 A1.*

(Continued)

*Primary Examiner* — Mohamed A Kamara

(57) ABSTRACT

A method of performing uplink mobile communications may include identifying a first uplink data and a second uplink data, wherein the first uplink data has a higher transmission priority than the second uplink data, and evaluating a plurality of candidate uplink channels to generate a plurality of uplink channel quality measures. Each of the plurality of uplink channel quality measures may be associated with one of the plurality of candidate uplink channels. The method may further include performing a comparison between one or more of the plurality of uplink channel quality measures to select a first uplink channel from the plurality of candidate uplink channels, transmitting the first uplink data using the first uplink channel, and transmitting the second uplink data using a second uplink channel of the plurality of candidate uplink channels.

20 Claims, 8 Drawing Sheets

(51) Int. Cl.
*H04W 72/04* (2009.01)
*H04L 5/00* (2006.01)
*H04L 1/20* (2006.01)
*H04W 72/08* (2009.01)

(56) References Cited

U.S. PATENT DOCUMENTS

| | | | |
|---|---|---|---|
| 2007/0232230 A1* | 10/2007 | Anke | H04L 49/90 |
| | | | 455/39 |
| 2007/0254655 A1* | 11/2007 | Tujkovic | H04B 7/0691 |
| | | | 455/435.1 |
| 2010/0281486 A1 | 11/2010 | Lu et al. | |
| 2011/0105173 A1* | 5/2011 | Haim | H04W 52/244 |
| | | | 455/522 |
| 2011/0165904 A1 | 7/2011 | Lee et al. | |
| 2012/0230217 A1 | 9/2012 | Sawai et al. | |
| 2014/0233403 A1 | 8/2014 | Kreuchauf et al. | |
| 2014/0313989 A1* | 10/2014 | Doken | H04L 65/605 |
| | | | 370/329 |
| 2015/0003336 A1* | 1/2015 | Singh | H04W 72/02 |
| | | | 370/329 |
| 2015/0092673 A1* | 4/2015 | Singh | H04W 8/22 |
| | | | 370/329 |
| 2016/0007229 A1* | 1/2016 | Gao | H04W 72/1284 |
| | | | 370/329 |
| 2016/0143025 A1* | 5/2016 | Chen | H04L 5/001 |
| | | | 370/329 |
| 2016/0150524 A1* | 5/2016 | Ramkumar | H04W 72/0413 |
| | | | 370/329 |
| 2017/0078945 A1* | 3/2017 | Ma | H04W 76/14 |

OTHER PUBLICATIONS

Extended European Search Report received for corresponding EP Patent Application No. 16153677.6 dated Apr. 6, 2016, 9 pages.

Office Action received for the corresponding TW Patent Application No. 105104318 dated Dec. 8, 2016, 13 pages. (Reference Purpose Only).

3GPP, "3rd Generation Partnership Project; Technical Specification Group Radio Access Network; Evolved Universal Terrestrial Radio Access (E-UTRA); Medium Access Control (MAC) protocol specification (Release 12)", Technical Specification, Dec. 2014, 3GPP TS 36.321 V12.4.0, France.

Office Action received for the corresponding EP Patent Application No. 16 153 677.6 dated May 18, 2017, 5 pages. (Reference Purpose Only).

Office Action received for the corresponding EP Patent Application No. 16 153 677.6 dated Nov. 8, 2017 (5 pages) (Reference Purpose Only).

Office Action received for the corresponding CN Patent Application No. 201610091440.1 dated Oct. 12, 2018, 9 pages. (Reference Purpose Only).

* cited by examiner

FIG. 6A

| Data | Data Priority Rank |
|---|---|
| 601 | 1 |
| 602 | 2 |
| 603 | 3 |
| 604 | 4 |
| 605 | 5 |
| 606 | 6 |
| 607 | 7 |
| 608 | 8 |
| 609 | 9 |
| 610 | 10 |

620   622   624

| Carrier Channel | Channel Rank | Time Period |
|---|---|---|
| 204 | 1 | 1 |
| 202 | 2 | 1 |
| 204 | 1 | 2 |
| 202 | 2 | 2 |
| 204 | 1 | 3 |
| 202 | 2 | 3 |

FIG. 6B

| Data | Data Priority Rank |
|---|---|
| 601 | 1 |
| 602 | 2 |
| 603 | 3 |
| 604 | 4 |
| 605 | 5 |
| 606 | 6 |
| 607 | 7 |
| 608 | 8 |
| 609 | 9 |
| 610 | 10 |

630   632   634

| Carrier Channel | Channel Rank | Time Period |
|---|---|---|
| 204 | 1 | 1 |
| 202 | 2 | 1 |
| 204 | 1 | 2 |
| 202 | 2 | 2 |
| 204 | 1 | 3 |
| 202 | 2 | 3 |

TERMINAL DEVICE AND MOBILE RADIO COMMUNICATION BY TERMINAL DEVICE

TECHNICAL FIELD

Various embodiments relate generally to a method for performing uplink mobile communications and a mobile communication terminal device.

BACKGROUND

The transition from voice-centered to data-centered mobile communication networks has resulted in a variety of additions and modifications to conventional mobile communication networks in order to support significantly higher data rates. One such advancement is the usage of multiple downlink carrier channels, which directly results in large increases in available bandwidth. This increased bandwidth in turn allows for substantially higher data download rates.

While considerable focus has been concentrated on high downlink data rates, significant increases in downlink data rates also requires comparable expansion of uplink data rates. As a result, numerous multiple uplink carrier channel schemes have been introduced, such as Dual-Carrier High Speed Uplink Packet Access (DC-HSUPA), Multi-Carrier HSUPA (MC-HSUPA), and uplink Carrier Aggregation. Similarly to multi-carrier downlink schemes, the aforementioned schemes allocate a plurality of uplink carrier channels for uplink transmission by a single mobile terminal. This increased uplink bandwidth consequently results in higher possible data rates.

As each of the allocated uplink carrier channels is an independent physical channel (i.e. defined by a distinct carrier frequency), each of the uplink carrier channels may exhibit unique channel characteristics as defined by the channel impulse response. Each of the uplink carrier channels may thus exhibit differences in channel characteristics that may vary in time with respect to the other uplink carrier channels, such as due to Doppler shift, path loss, multipath effects, etc.

It is therefore possible that one or more of the allocated uplink carrier channels available to a mobile terminal in a multiple-carrier uplink scheme may be of higher quality than the remaining channels. It subsequently may be feasible to utilize smart selection of uplink data to transmit on each of the channels, as one or more of the allocated uplink carrier channels may offer significantly better protection of data during wireless transmission than the other channels. Selecting an appropriate carrier channel from the available uplink carrier channels with which to transmit important data may therefore offer a number of advantages related to successful reception of the important data by a target receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 6A and 6B show exemplary channel mappings using two available uplink carrier channels;

DESCRIPTION

Figure 1:
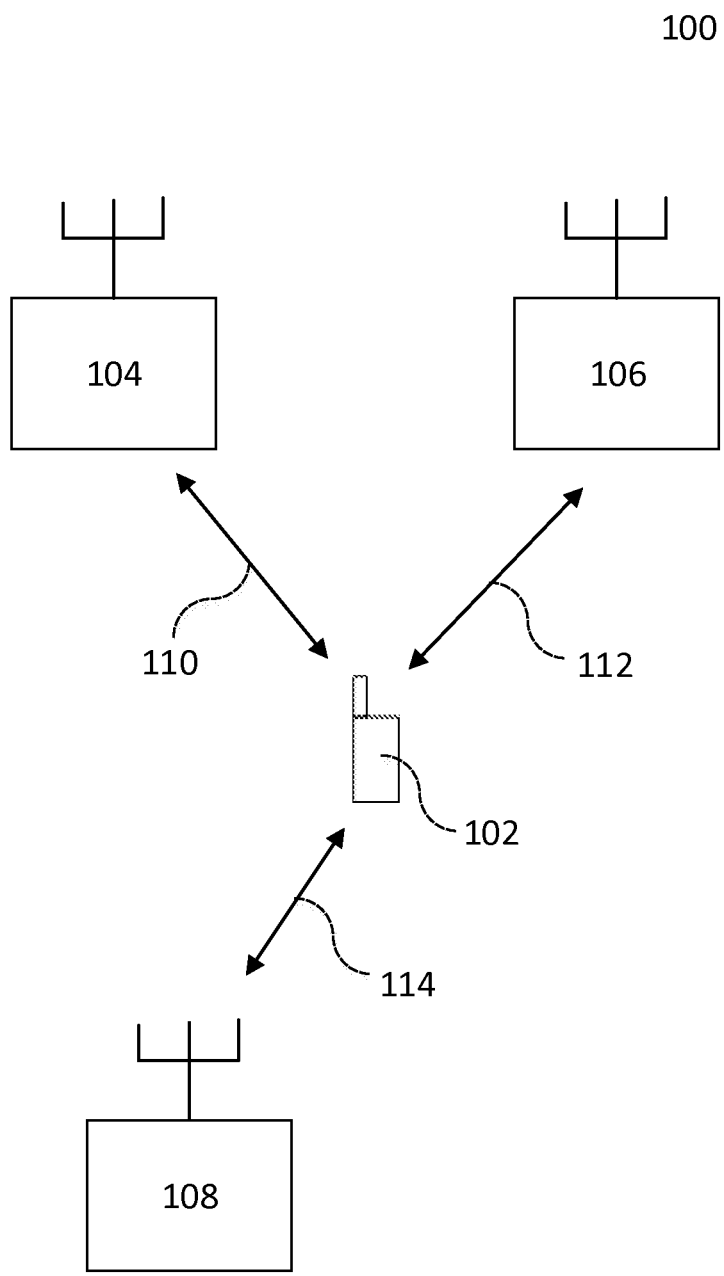
FIG. 1 shows a mobile radio communication system according to an exemplary aspect of the disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

As used herein, a "cell" in the context of telecommunications may be understood as a sector of a base station. A base station may thus be composed of one or more "cells" (or sectors), where each cell includes at least one unique communication channel. An "inter-cell handover" may thus be understood as a handover from a first "cell" to a second "cell", where the first "cell" is different than the second "cell". "Inter-cell handovers" may be characterized as either "inter-base station handovers" or "intra-base station handovers". "Inter-base station handovers" may be understood as cell reselection from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" which a mobile terminal is currently connected to according to the mobile communication protocols of the associated mobile communication network standard.

Multiple uplink carrier schemes, such as e.g. dual-carrier HSUPA or multi-carrier HSUPA in UMTS networks and uplink carrier aggregation in LTE networks, may be implemented in order to substantially increase uplink data rates.

By definition, each of these schemes may utilize a plurality of uplink carrier channels to transmit data from a UE to cells located at one or more base stations. Each of these carrier channels may be a distinct physical channel, and may thus exhibit its own unique channel characteristics, such as path-loss, multipath, Doppler shift, etc. Accordingly, some available carrier channels in a multi-carrier scheme may be of higher quality than others, and may thus offer better protection of data during uplink transmission. The reception of data transmitted on these channels may therefore be superior to that of data transmitted on lower-quality carriers, and consequently data may be received at a higher quality with less needed retransmissions.

An exemplary aspect of the disclosure may thus take advantage of the non-uniform channel quality of carrier channels in a multi-carrier scheme to ensure effective transmission of critical data. Such critical data, such as protocol control signaling, streamlining data, acknowledgement messages, etc., may be identified and transmitted using carriers that are established as offering a high quality of transmission, thereby better protecting uplink data during transmission from a UE. These high-quality channels may be identified by evaluating and/or comparing channel quality indicators of the available channels. Lower-priority data may then be transmitted using the remaining other carrier channels.

FIG. 1 shows mobile radio communication system 100. As will be further described, mobile communication system 100 may utilize carrier channel evaluations in order to protect critical data during uplink transmissions from a UE. Mobile radio communication terminal device 102 such as e.g. a User Equipment (UE) 102 may receive a plurality of radio signals from one or more base stations 104, 106, and 108, e.g. via respective air interfaces 110, 112, and 114. Air interfaces 110-114 may include one or more physical communication channels, which may be directly used to perform uplink and/or downlink communications between UE 102 and base stations 104-108. It is to be noted that although the further description uses a configuration of mobile radio communication system 100 in accordance with a Universal Mobile Telecommunication System (UMTS) network or Long Term Evolution (LTE) network, for explanation, any other mobile radio communication system 100 may be provided, such as any 3GPP (3$^{rd}$ Generation Partnership Project) or 4GPP (4$^{th}$ Generation Partnership Project) mobile radio communication system.

UE 102 may therefore receive radio signals from one or more of base stations 104-108. Base stations 104-108 may be connected with the underlying mobile communication network, and thus may enable connected mobile terminals to exchange data with the core network. Base stations 104-108 may be divided into one or more cells (also referred to herein as sectors), and accordingly may have one or more sector antennas that each serve a unique cell of base stations 104-108. Each cell may offer a unique communication channel which UE 102 may utilize to exchange data, and accordingly UE 102 may be capable of exchanging data using a number of different cells. UE 102 may select an appropriate cell, e.g. a serving cell, through e.g. cell search and measurement and cell selection/reselection. UE 102 may then exchange downlink and/or uplink data with the serving cell using appropriate mobile communication network protocols. For example, UE 102 may select a cell of base station 104 as the serving cell, and accordingly base station 104 may be the serving cell site. UE 102 may then select a new cell as the serving cell (i.e. inter-cell handover) through cell reselection processes. The new serving cell may be located at a different base station (i.e. inter-base station handover), e.g. base station 106 or base station 108, or may be a different cell of the base station 104 (i.e. intra-base station handover).

Accordingly, UE 102 may be capable of communicating with one (or more) of base stations 104-108 over a number of different, unique carrier channels. While early 3GPP mobile communication standards permitted uplink and downlink communication using only a single carrier channel, recent 3GPP releases for UMTS and LTE networks allow the use of multiple carrier channels for both uplink and downlink communication. Exemplary 3GPP multi-carrier schemes include Dual-Carrier High Speed Packet Access (DC-HSPA, also known as Dual-Cell HSPA) and Multi-Carrier HSPA for UMTS networks and Carrier Aggregation (CA) for LTE networks (specifically LTE-A networks). The use of more than one carrier in these multi-carrier schemes directly result in increased bandwidth over single carrier schemes, thereby potentially allowing substantial increases in data throughput.

Early introductions of the aforementioned multi-carrier schemes reflected an increased focus on multiple carriers for downlink communication. However, more recent releases have additionally accommodated for multiple carriers in uplink communication, such as DC-High Speed Uplink Packet Access (DC-HSUPA, included as part of DC-HSPA), MC-High Speed Uplink Packet Access (MC-HSUPA, included as part of MC-HSPA), and Carrier Aggregation for uplink. While the following examples and implementations may refer specifically to one of these 3GPP-specified multi-carrier schemes for uplink data transmission, it is understood that the detailed devices and methods may be similarly implemented for any number of uplink data transmission schemes that utilize multiple carriers.

As previously detailed, the use of multiple carriers may substantially increase available bandwidth, thereby allowing considerable increases in both data rate and throughput. In addition to the known benefits associated with data rate and throughput, the availability of multiple uplink carrier channels may also be advantageously utilized in order to ensure successful transmission of uplink data from a UE.

For example, a multi-carrier uplink scheme may provide a plurality of available carrier channels that a UE may use to transmit uplink data. These available carrier channels may each be a distinct, unique physical channel, and accordingly each available carrier channel may have its own distinct channel characteristics. The carrier channels may vary in quality over time, e.g. due to Doppler shift, path loss, multipath, etc., and consequently some carrier channels may be of higher quality than others. These carrier channels may therefore be more effective for data transmission, and may offer greater protection of data.

It may therefore be practical for a UE to utilize the highest quality available channel (or channels) to transmit high-priority data. This high-priority data, such as e.g. protocol control signaling, streaming data, and/or acknowledgement/non-acknowledgement (ACK/NACK) messages, may be essential to maintaining existing communication sessions and/or ensuring a satisfactory user experience. A UE may thus prioritize the successful transmission of such high-priority data over transmission of other, less-essential data, and consequently may choose to transmit this critical data using the high-quality channels. A UE may then transmit less-essential data, i.e. lower priority data, over the remaining available carrier channels.

In other words, a UE configured to operate on a multi-carrier uplink scheme may have a plurality of carrier channels available for use in uplink transmission of data. The UE may additionally have certain types of data, e.g. high-priority data, for which successful transmission to the network (e.g. by transmission to a nearby base station) is essential. A UE may thus evaluate the plurality of available carrier channels in order to determine which channel or channels are of sufficient quality, and thus are suitable for use in transmitting high-priority data. The UE may then transmit the high-priority uplink data to a nearby base station using the selected carrier channels. The remaining uplink carrier channels available in the multi-carrier scheme may then be utilized to transmit lower-priority uplink data. The UE may choose to transmit moderate-priority data using e.g. the carrier channel with the second-highest quality.

Utilizing the carrier channel with the highest estimated quality may result in better protection of high-priority data during uplink transmission. Accordingly, this may increase the probability that the high-priority data is successfully received by the base station, thereby reducing retransmission requests, increasing throughput, reducing the likelihood of radio link failure, and providing an overall increased user experience.

Referring back to FIG. 1, UE 102 may thus be configured to perform uplink transmissions using multiple carrier channels. While the majority of the following examples and aspects may substantially focus on multiple-carrier uplink schemes, UE 102 may additionally be configured to perform downlink transmissions using multiple carrier channels. Dependent on the availability and quality of carrier channels, UE 102 may additionally perform uplink and/or downlink communications using only a single carrier channel.

Figure 2:
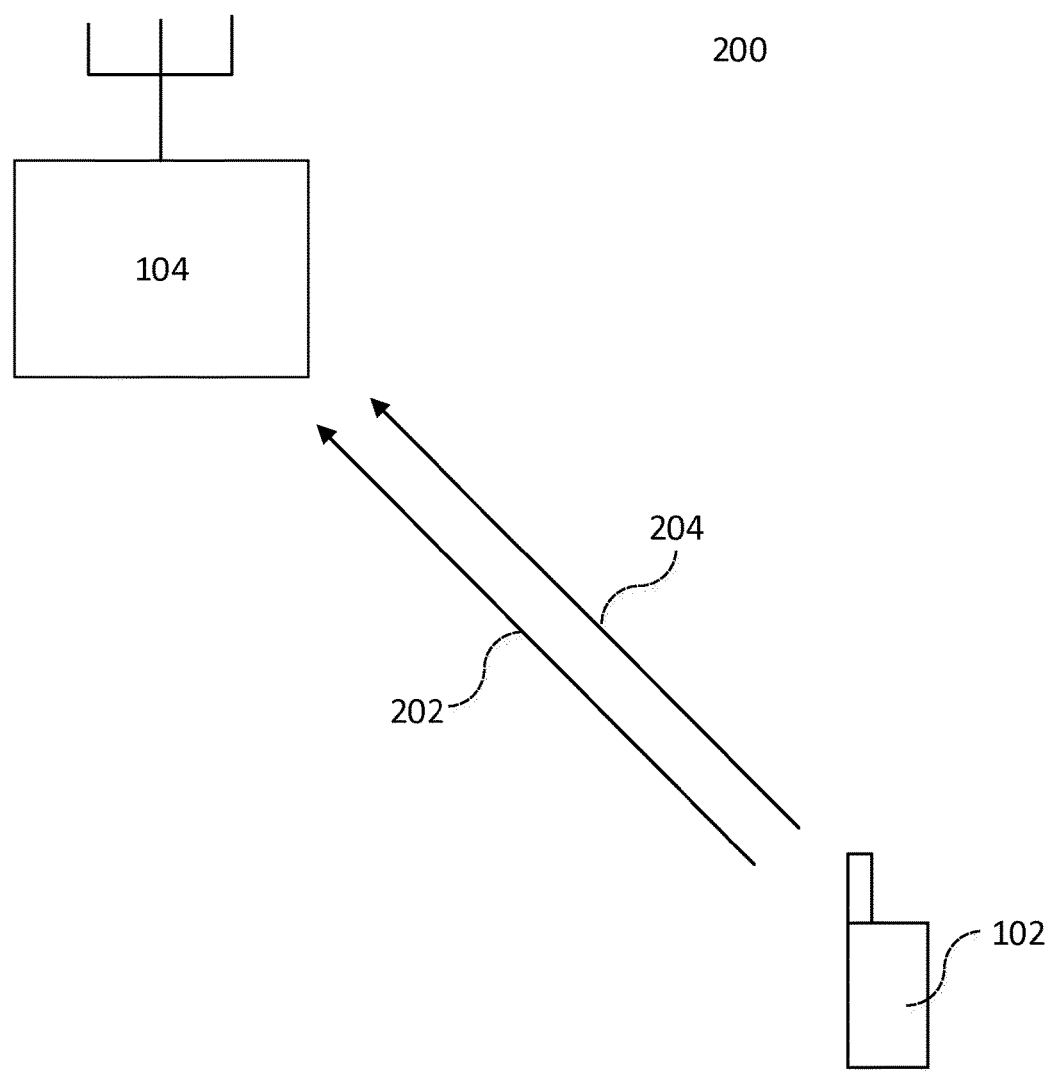
FIG. 2 shows a mobile radio communication system according to another exemplary aspect of the disclosure.

FIG. 2 shows an exemplary scenario in which UE 102 may utilize one or more carrier channels to perform uplink communications with a nearby base station, thereby performing uplink mobile communications with the mobile communication network. As shown in FIG. 2, UE 102 may be engaged in multi-carrier uplink communications with base station 104 using uplink carrier channels 202 and 204. Referring back to FIG. 1, uplink carrier channels 202 and 204 may thus be included in air interface 110.

Uplink carrier channels 202 and 204 may be the available carrier channels of the multi-carrier uplink scheme. Uplink carrier channels 202 and 204 may be located in the same licensed frequency band, and may be either be contiguous or non-contiguous in the frequency domain. Alternatively, uplink carrier channels 202 and 204 may be located in different licensed frequency bands. Uplink carrier channels 202 and 204 may be associated with the same sector, e.g. configured to provide service to the same sector of base station 104, or alternatively may be associated with different cells of base station 104. While FIG. 2 shows uplink carrier channels 202 and 204 as being both associated with base station 104, it may be possible for UE 102 to utilize a plurality of uplink carrier channels associated with more than one base station. More than two uplink carrier channels may also be provided, such as e.g. 3, 4, or 8 uplink carrier channels. It is understood that the number of available uplink carrier channels as well as the physical channels that are available to UE 102 may change over time, and may be dependent on e.g. base station configuration, current channel conditions, available network resources, radio access technology, network architecture, UE location, and/or other network defined protocols. Many such variations in the nature and relationship of the available uplink carrier channels are possible, and it is understood that the aforementioned examples and approaches may apply to any such carrier channel configuration.

UE 102 may thus utilize uplink carrier channels 202 and 204 to transmit uplink data to base station 104. In addition to the increased bandwidth offered by multiple uplink carrier channels, UE 102 may identify uplink carrier channels with superior channel quality. UE 102 may then utilize the identified channels to transmit high-priority data in order to ensure that the critical data is effectively received by the mobile communication network. UE 102 may transmit less-essential data on the remaining available uplink carrier channels.

As previously detailed, UE 102 may evaluate uplink carrier channels 202 and 204 in order to assess the quality of each uplink channel. As each uplink carrier channel is a unique physical channel, each of uplink carrier channels 202 and 204 may exhibit distinct channel characteristics (i.e. defined by the channel impulse response of each carrier channel) that may affect the quality of wireless data transmission. UE 102 may evaluate each carrier channel 202 and 204 to obtain a quantitative metric representative of the channel quality of each of uplink carrier channels 202 and 204, such as e.g. received signal power, received signal quality, block error rate (BLER), retransmission rate, and/or power headroom. As will be described, UE 102 may utilize one or more of these channel quality measures to identify the highest quality channel for uplink data transmission.

In an exemplary aspect of the disclosure, UE 102 may measure a retransmission rate of packets transmitted on uplink carrier channels 202 and 204. For example, UE 102 may be engaged in multi-carrier uplink data transmission with base station 104 over uplink carrier channels 202 and 204. Base station 104 may thus receive data packets by receiving and demodulating wireless signals received over uplink carrier channels 202 and 204. Base station 104 may evaluate each received packet to determine whether the packet was received properly or improperly. Base station 104 may send UE 102 an acknowledgement message (e.g., ACK) in response to properly received data packets. Base station 104 may also determine that one or more received packets were not received properly, i.e. were corrupted, and may consequently request that UE 102 retransmit the affected packets (e.g. by sending a NACK in response to be improperly received data packets).

UE 102 may thus receive one or more retransmission requests (e.g. a NACK) from base station 104 following unsuccessful uplink transmission of one or more packets. The channel quality of uplink carrier channels 202 and 204 may have a direct impact on the number of retransmission requests received by UE 102. For example, uplink carrier channel 202 may be suffering from poor channel quality, e.g. due to path loss, multi-path fading, Doppler shift, interference, and/or noise. Data transmitted by UE 102 over uplink carrier channel 202 may thus suffer from a high degree of corruption, which may result in improper reception of contained data packets by base station 104. Base station 104 may then send UE 102 a retransmission request for the corrupted data packets transmitted over uplink carrier channel 202. UE 102 may receive a high number of retransmission requests from base station 104 for packets transmitted using uplink carrier channel 202 if uplink carrier channel 202 maintains low channel quality for a sustained period of time.

UE 102 may thus interpret high quantities of received retransmission requests as indicative of poor channel quality. UE 102 may calculate a retransmission rate, which may be e.g. the percentage of transmitted data packets which a retransmission request/NACK was received in response to or the ratio of retransmission requests/NACKs to ACKs. UE 102 may calculate such a retransmission rate for each utilized uplink carrier channel, e.g. for uplink carrier channels 202 and 204 in the exemplary scenario of FIG. 2, and then may utilize the calculated retransmission rates in order to quantitatively analyze the channel quality of each available uplink carrier channel. UE 102 may determine that carrier channels with relatively low retransmission rates are of high quality, and thus offer high protection of uplink data during transmission. Conversely, UE 102 may determine that carrier channels with high retransmission rates are of low quality, and correspondingly may lead to poor reception of data packets by base station 104.

After calculating a retransmission rate for each uplink carrier channel, UE 102 may utilize the calculated retransmission rates as a channel quality measure in order to identify the highest-quality uplink carrier channels. For example, UE 102 may compare the calculated retransmission rates of each uplink carrier channel in order to identify the uplink carrier channel with the lowest retransmission rate. In the exemplary scenario detailed above, uplink carrier channel 202 may have a lower channel quality than uplink carrier channel 204, and accordingly UE 102 may receive a higher number of retransmission requests from base station 104 for data packets transmitted over uplink carrier channel 202 than for data packets transmitted over uplink carrier channel 204. UE 102 may calculate the retransmission rates for both uplink carrier channels 202 and 204, and then may compare the calculated retransmission rates with one another. UE 102 may identify uplink carrier channel 202 as having a higher retransmission rate than uplink carrier channel 204, and accordingly may identify uplink carrier channel 204 as having superior channel quality than uplink carrier channel 202.

Upon identifying uplink carrier channel 204 as the superior channel in terms of quantitative channel quality measure, UE 102 may select high-priority uplink data and transmit the high-priority uplink data to base station 104 using uplink carrier channel 204. UE 102 may then identify lower-priority data and transmit the lower-priority data to base station 104 using uplink carrier channel 202. UE 102 may identify the high-priority uplink data based on the content of the data, and may be based on how important the content of the data is to ensure high performance of mobile communications.

For example, UE 102 may be configured to identify control signaling, such as e.g. protocol control signaling messages, as high-priority data. Protocol control signaling may be necessary in order to manage an ongoing communication session, and unsuccessful transmission of such protocol control signaling to a base station may have a significant negative effect on any ongoing communication sessions. Protocol control signaling may thus be identified as high-priority data.

Other types of data may also be considered high-priority by UE 102. Such high-priority data may be characterized as data which, when unsuccessfully transmitted, has a significant negative impact on mobile communication performance. Streaming data packets may additionally be considered critical or high-priority, as the loss of one or more packets in a streaming data session may cause a data stream to be momentarily interrupted, drop in quality, or terminate altogether. Acknowledgements or non-acknowledgement messages, such as e.g. ACK/NACKs in Radio Link Control (RLC) or Transmit Control Protocol (TPC), may additionally be classified as high-priority.

UE 102 may accordingly prioritize the transmission of these high-priority data types over other data types with less priority. Lower-priority data types may include normal user data, such as e.g. conventional, non-protocol/control IP data. While failure to transmit this low-priority data may negatively impact network performance, the overall negative effect may be limited compared to the failure to transmit the aforementioned high-priority data. UE 102 may thus wish to utilize carrier channels of superior quality to transmit high-priority data, while transmitting lower-priority data using the remaining carrier channels.

Referring back to aforementioned example, UE 102 may determine that uplink carrier channel 202 has a higher retransmission rate than uplink carrier channel 204. UE 102 may accordingly select uplink carrier channel 204 as the superior uplink carrier channel based on the calculated retransmission rates of each of uplink carrier channels 202 and 204. Upon this selection of uplink carrier channel 204, UE 102 may then identify high-priority uplink data scheduled for transmission to base station 104. As previously detailed, the high-priority uplink data may be e.g. protocol control signaling, streaming data, or ACK/NACK messages. UE 102 may then transmit the high-priority uplink data using uplink carrier channel 204 in order to offer better protection of the high-priority data during transmission to base station 104. This may improve the likelihood that the high-priority uplink data is successfully received by base station 104, thereby avoiding negative performance issues triggered by from unsuccessful transmission of high-priority uplink data.

UE 102 may then identify low-priority uplink data, which may be the remaining uplink data scheduled to be transmitted. UE 102 may then utilize uplink carrier channel 202 in order to transmit the low-priority uplink data. UE 102 may prioritize the transmission of the high-priority uplink data over the transmission of the low-priority uplink data in this manner. UE 102 may additionally be configured to identify moderate- or medium-priority data and to transmit the moderate- or medium-priority data using high-quality carrier channel 204, e.g. dependent upon the available capacity of high-quality carrier channel 204.

Uplink carrier channel 204 may be capable of transmitting additional data along with high-priority uplink data. For example, UE 102 may only have a small amount of high-priority uplink data to transmit. UE 102 may thus transmit other data with the high-priority uplink data over uplink carrier channel 204. For example, UE 102 may identify low-priority data to transmit over uplink carrier channel 204 along with the high-priority data if uplink carrier channel 204 is capable of transmitting additional data. UE 102 may then transmit the remaining low-priority data over uplink carrier channel 202.

UE 102 may additionally perform an analysis of scheduled uplink data in order to rank or list uplink data according to priority. UE 102 may then utilize all available capacity uplink carrier channel 204 to transmit the uplink data identified as being higher priority, and transmit the remaining data on uplink carrier channel 202.

UE 102 may additionally be configured to utilize more than two available uplink carrier channels, such as e.g. 3, 4, or 8 uplink carrier channels. Similarly to as detailed regarding two carrier channels, UE 102 may calculate a channel quality measure, such as e.g. a retransmission rate, for each available carrier channel. UE 102 may then rank or list the available uplink carrier channels based on the calculated channel quality measures, and may then send high-priority data on the highest-quality available uplink carrier channel. UE 102 may then utilize the remaining available uplink carrier channels to transmit the remaining data.

Figure 3:
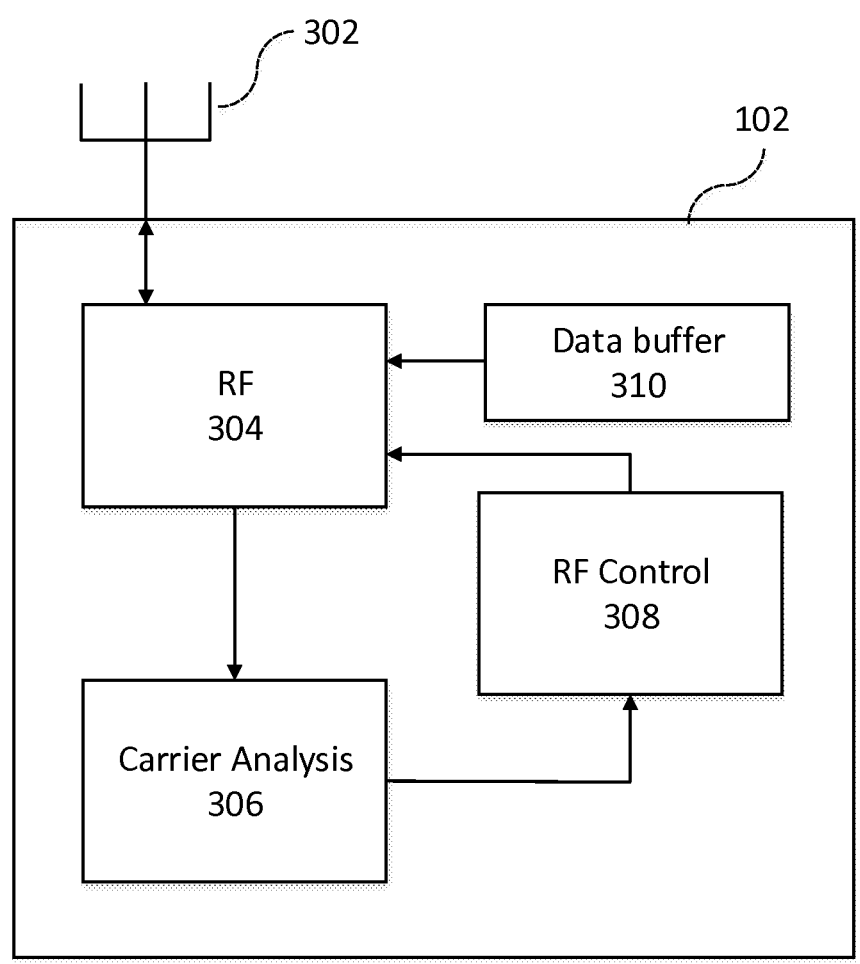
FIG. 3 shows various components and circuits of the UE of FIGS. 1 and 2.

FIG. 3 illustrates an exemplary configuration of UE 102 in accordance with an aspect of the disclosure. As shown in FIG. 3, UE 102 may include antenna 302, RF transceiver 304, carrier analysis circuit 306, RF control circuit 308, and data buffer 310. The aforementioned circuitry and hardware may be implemented as separate circuits, e.g. as separate integrated circuits, as illustrated in FIG. 3. However, it is understood that some or all of the circuits may be implemented by a common programmable processor, such as e.g. a microprocessor. Accordingly, some or all of the functionality of the one or more of the aforementioned components may be consolidated into a single hardware component. It is also understood that UE 102 may include a number of additional components, including hardware, processors, memory, and other specialty or generic hardware/processors/circuits, etc., in order to support a variety of additional operations of wireless radio communications. UE 102 may also include a variety of user input/output devices such as displays, keypads, touchscreens, speakers, external buttons, etc.

Antenna 302 may be composed of a single antenna, or alternatively may be an antenna array composed of a plurality of antennas. Antenna 302 may receive wireless radio signals, such as e.g. mobile communication signals received over wireless air interfaces 110-114 from base stations 104-108. Antenna 302 may transduce the received wireless radio signals and provide resulting electrical radio frequency signals to RF transceiver 304. RF transceiver 304 may be configured to demodulated and digitize the radio frequency signals received from antenna 202, such as e.g. by selecting a carrier frequency and performing analog to digital conversion of the radio frequency signal. RF transceiver 304 may select a carrier frequency to receive radio frequency signals based on the carrier frequencies of one or more transmitting cells, and accordingly may receive desired signals transmitted by the one or more transmitting cells. RF transceiver 304 may then provide received the resulting digitized signals to one or more components of UE 102, such as e.g. one or more processing circuits (not explicitly shown). UE 102 may then perform appropriate actions in response to the digitized signals, such as e.g. providing a user with voice data or other data information, performing cell measurements, or a variety of additional mobile communication operations. It is understood that such functionality of mobile terminals is well-known by those of skill in the art, and accordingly will not be further described herein.

RF transceiver 304 may also be configured to perform transmission of radio frequency signals, such as e.g. by receiving baseband signals intended for uplink transmission from other components of UE 200, modulating the received baseband signals onto a radio carrier frequency, and wirelessly transmitting the resulting radio frequency radio signals using antenna 202. UE 102 may exchange data with one or more base stations, such as e.g. base stations 104-108 in this manner.

RF transceiver 304 may be configured to operate using multiple uplink carrier channels. RF transceiver 304 may thus be capable of transmitting uplink data on multiple carrier channels. Antenna 302 may also be capable of simultaneously transmitting wireless radio signals on multiple carrier frequencies, and accordingly may be implemented as an antenna array.

As shown in FIG. 3, RF transceiver 304 may receive and process radio frequency signals received by antenna 302, such as e.g. by digitization and/or demodulation. Carrier analysis circuit 306 may then receive the digitized and/or demodulated signals, and may perform measurements on the received digitized and/or demodulated signals in order to evaluate the carrier channel that the received radio signals were transmitted on. As previously detailed, RF transceiver 304 may select or "tune" to a certain carrier frequency for a given carrier channel in order to receive radio frequency signals from a target cell. RF transceiver 304 may thus receive the radio frequency signals and provide the resulting digitized and/or demodulated signals to carrier analysis circuit 306.

Carrier analysis circuit 306 may then calculate a quantitative channel quality measure for the given carrier channel, thereby obtaining a quantitative measure of channel quality for the given channel. Carrier analysis circuit 306 may receive a plurality of receive digitized signals from RF transceiver 304 that are associated with a plurality of different carrier channels. Carrier analysis circuit 306 may then calculate a channel quality measure for each of the plurality of different carrier channels based on the received digitized signals. UE 102 may then utilize the obtained channel quality measures in order to effectively protect high-priority data by transmitting high-priority data on channels identified as having high channel quality measures. As will be later described, carrier analysis circuit 306 may be configured to calculate a variety of different channel quality measures, such as e.g. retransmission rate, block error rate (BLER), received signal power, received signal quality, and power headroom.

Carrier analysis circuit 306 may provide the calculated channel quality measures for each of the plurality of different carrier channels to RF control circuit 308. RF control circuit 308 may be configured to evaluate each of the channel quality measures in order to determine which of the plurality of carrier channels have the highest channel quality measures, thereby determining which of the plurality of carrier channels are of the highest quality.

RF control circuit 308 may thus determine the highest-quality channel (or channels) from the plurality of different carrier channels. RF control circuit 308 may then select the highest-quality as a selected carrier channel, and may provide RF transceiver 304 with a control signal indicating the selected carrier channel.

As previously detailed, UE 102 may identify high-priority data and subsequently transmit the high-priority data using the identified highest-quality available carrier channel. UE 102 may additionally include data buffer 310, which may be configured to identify the high-priority data. Data buffer 310 may contain uplink data scheduled for transmission from UE 102. The uplink data stored in data buffer 310 may thus include a variety of different types of data, such as e.g. voice data, audio/video/multimedia data, other packet data, control signaling, acknowledgement messages, measurement reports, etc. Data buffer 310 may be configured to identify which of the stored data is high-priority, i.e. which data is most important for maintaining satisfactory performance of mobile communications. Data buffer 310 may be configured to identify protocol control signaling, streaming data, and/or ACK/NACK messages as high-priority data.

Data buffer 310 may be configured to provide stored uplink data to RF transceiver 304. RF transceiver 304 may then transmit the received uplink data using antenna 302 to one or more base stations, e.g. including base station 104. Data buffer 310 may be configured to identify and provide high-priority data to RF transceiver 304 with the intention that the identified high-priority data will be transmitted by RF transceiver 304 using a high-quality channel as identified by RF control circuit 308. Data buffer 310 may also identify lower-priority data, e.g. non-high-priority data, and may additionally supply the lower-priority data to RF transceiver 304 with the intent that the high-priority data will be given a higher priority for transmission on a high-quality channel than the lower-priority data. Accordingly, RF transceiver 304 may transmit the high-priority data using a high-quality channel (as indicated by RF control circuit 308) and may transmit the lower-priority data using a carrier channel other than the high-quality channel.

In this manner, UE 102 may identify high-priority data along with at least one high-quality channel from a plurality of available carrier channels. UE 102 may then transmit the high-priority data using the identified highest-quality channel, thereby offering improved protection to the high-priority data during transmission. The high-priority data may then be received at a higher quality by a target base station, e.g. base station 104 as shown in FIG. 2.

Carrier analysis circuit 306, RF control circuit 308, and data buffer 310 will now be described in further detail. As previously detailed, carrier analysis circuit 308 may calculate a channel quality measure for each of a plurality of carrier channels. Carrier analysis circuit 308 may be configured to calculate different types of channel quality measures, including e.g. retransmission rate, block error rate (BLER), received signal power, received signal quality, and power headroom.

As previously detailed, UE 102 may calculate a retransmission rate for each of a plurality of carrier channels by analyzing the number of retransmission requests (in the form of received ACK/NACKs) received that are associated with each of the plurality of carrier channels. This may be performed by carrier analysis circuit 306, i.e. carrier analysis circuit 306 may be configured to identify retransmission requests in the digitized signal received from RF transceiver 304 and associate each retransmission request with one of the plurality of carrier channels. Alternatively, another component (not shown) may be provided in UE 102 that is configured to identify retransmission requests and provide indication of such to carrier analysis circuit 306. As previously detailed, a connected base station, such as e.g. base station 104 as illustrated in FIG. 2, may analyze uplink data packets received from UE 102 in order to determine if the received packets are corrupted. Base station 104 may perform this determination based on an error-checking scheme such as e.g. Cyclic Redundancy Check (CRC), and may transmit a retransmission request to UE 102 if a data packet is unsuccessfully received by base station 104, i.e. is corrupted.

Base station 104 may thus send an ACK message to UE 102 in response to a data packet being successfully received, and may send a NACK message (i.e. retransmission request) in response to data packet being unsuccessfully received. RF transceiver 304 may then receive and decode the received ACK/NACK messages and provide them to carrier analysis circuit 306. Carrier analysis circuit 306 may then calculate a retransmission rate for each uplink carrier channel based on the received ACK/NACK messages associated with each carrier channel, where higher retransmission rates may be interpreted to indicate low channel quality and low retransmission rates may be interpreted to indicate high channel quality. Carrier analysis circuit 306 may then provide RF control circuit 308 with a channel quality measure. The channel quality measure may be e.g. a raw retransmission rate value or another value based on the raw retransmission rate, such as e.g. a value ranging from 0.0 to 1.0. Carrier analysis circuit 306 may thus rate or scale the raw channel quality measure in order to obtain a rating or scaled value, and subsequently supply this rating or scaled value to RF control circuit 308. RF control circuit 308 may thus be configured to select the highest-quality channel based on the rating or scaled values. It is understood carrier analysis circuit 306 and RF control circuit 308 may be configured to operate with ratings or scaled values for the implementations disclosed herein. It is also understood that such a process may require a cumulative retransmission rate calculation, i.e. the calculation of a retransmission rate for each carrier channel over a set period of time.

Alternatively, RF transceiver 304 may provide an output digitized signal to a processing circuit (not shown), which may then decode any information contained in the output digitized signal and provide any detected ACK/NACK messages to carrier analysis circuit 306.

In an alternative exemplary aspect of the disclosure, carrier analysis circuit 306 may be configured to estimate a block error rate (BLER) for each of the plurality of carrier channels. Carrier analysis circuit 306 may be configured to estimate the BLER for each carrier channel based on the retransmission requests (i.e. received ACK/NACK messages) associated with each available carrier channel received from a base station, e.g. base station 104. Carrier analysis circuit 306 may thus be configured to implement one or more algorithms to estimate BLER from received retransmission requests.

It is noted that UE 102 may be required to perform measurements of neighboring cells, i.e. cells other than the serving cell located at base station 104, depending on radio link conditions. The measurements may be performed during measurement gaps, during which UE 102 may temporarily suspend reception from the serving cell in order to measure neighboring cells. The timing of the measurement gaps may be strategically selected to coincide with a time slot during which an ACK/NACK message is scheduled to be received from the serving cell (i.e. base station 104), and accordingly the reception of the ACK/NACK message may be skipped. UE 102 may be configured to interpret the skipped ACK/NACK timeslots as an ACK. As this scenario involves an "assumed" ACK, carrier analysis circuit 306 may be configured to ignore the "assumed" ACK messages in the calculation of the retransmission rate.

The aforementioned examples detailing retransmission rate and BLER calculation by carrier analysis circuit 306 have thus far only examined retransmission request rates for uplink transmissions, i.e. retransmission requests received from base station 104 that request retransmission of uplink data transmitted from UE 102. These channel quality measures are therefore based solely on the uplink carrier channels used to transmit uplink data from UE 102. However, it may be possible to additionally consider information associated with one or more downlink carrier channels in certain scenarios in order to identify the highest quality uplink carrier channels.

For example, UE 102 may be configured to operate using a Time Division Duplex (TDD) scheme in order to perform both uplink and downlink communications with base station 104. Accordingly, the same physical channel may be used for both uplink and downlink transmissions between UE 102 and base station 104, i.e. an identical carrier frequency may be used for both the uplink and downlink carrier channels. Due to channel reciprocity, the uplink carrier channel may share substantially similar channel characteristics with the downlink carrier channel. UE 102 may therefore utilize channel quality measures related to a downlink carrier channel corresponding with an available uplink carrier channel in order to evaluate the quality of the available uplink carrier channel.

Figure 4:
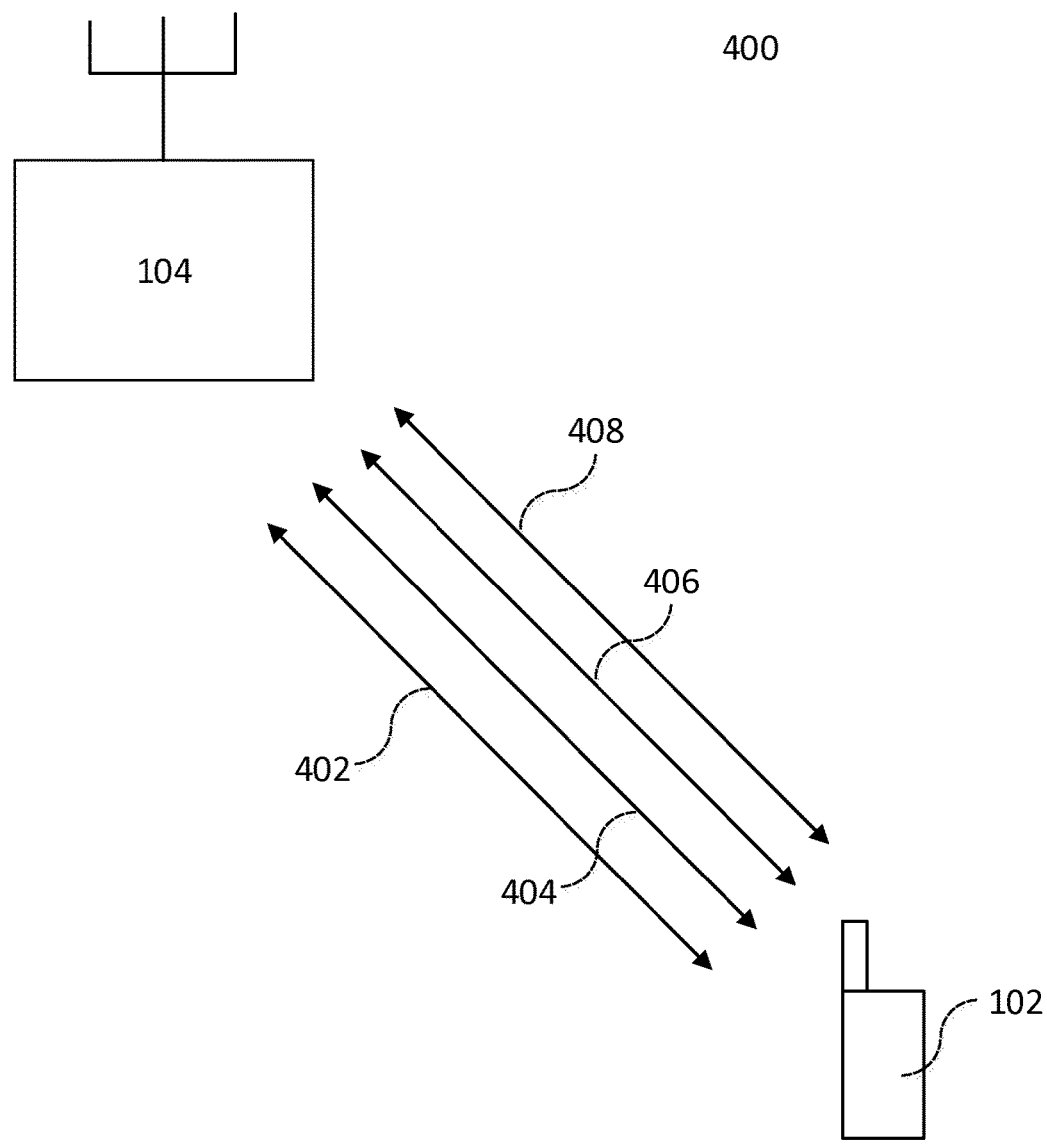
FIG. 4 shows a mobile radio communication system according to another exemplary aspect of the disclosure.

FIG. 4 shows an exemplary scenario in which UE 102 is engaged in multi-carrier uplink and downlink communications with base station 104. UE 102 may transmit uplink data over a multi-carrier uplink scheme using carrier channels 402, 404, 406, and 408. UE 102 may also receive downlink data transmitted base station 104 over carrier channels 402, 404, 406, and 408, e.g. by using a TDD scheme where the same carrier frequency is used for uplink and downlink transmissions. Carrier channels 402, 404, 406, and 408 may therefore be utilized for both uplink and downlink transmissions.

UE 102 may thus utilize information regarding downlink transmissions received from base station 104 over the downlink path of one of carrier channels 402-408 in order to evaluate the corresponding uplink path of one of carrier channels 402-408.

For example, UE 102 may receive downlink data from base station 104 over the downlink path of carrier channel 404. Similarly to as performed by base station 104, UE 102 may perform an analysis of the received downlink data to determine if the downlink data was successfully or unsuccessfully received. If downlink data transmitted over the downlink path of carrier channel 404 is not successfully received, UE 102 may send a downlink retransmission request to base station 104 in the form of a NACK message. Conversely, UE 102 may send an ACK message to base station 104 if downlink data transmitted on carrier channel 404 is successfully received. As the downlink path of carrier channel 404 may share substantially similar channel characteristics of the uplink path of carrier channel 404 (i.e. due to channel reciprocity associated with use of the same carrier frequency), UE 102 may factor downlink retransmission requests associated with the reception of downlink data on carrier channel 404 in the analysis of the uplink path of carrier channel 404.

UE 102 may thus monitor downlink retransmission requests sent to base station 104 regarding each of the available carrier channels 402-408. For example, RF transceiver 304 (or another component of UE 102 configured to initiate downlink retransmission requests) may provide carrier analysis circuit 306 with an indication of a downlink retransmission request along with identification of the carrier channel, e.g. one of available carrier channels 402-408, to which the downlink retransmission request is connected to. Carrier analysis circuit 306 may then calculate a downlink retransmission rate for each of available carrier channels 402-408 for use as a channel quality measure indicative of the channel quality of the uplink path of each of available carrier channels 402-408. Carrier analysis circuit 306 may then provide RF control circuit 308 with the downlink retransmission rate as a channel quality measure, and RF control circuit 308 may then determine the highest quality uplink carrier channels based on the downlink retransmission rate.

For example, regarding the scenario detailed in FIG. 4, UE 102 may transmit a high number of downlink retransmission requests for downlink packets received on carrier channel 408. UE 102 may transmit a moderate number of downlink transmission requests for downlink packets received on carrier channels 402 and 404, and may transmit a low number of downlink transmission requests for downlink packets received on carrier channel 406. Carrier analysis circuit 306 may then determine a downlink retransmission rate associated with each of carrier channels 402-408 based on the ACK/NACK messages transmitted to base station 104, and may provide RF control circuit 308 with the resulting downlink retransmission rates. RF control circuit 308 may then evaluate the received downlink retransmission rates for each of carrier channels 402-408 in order to identify the highest-quality uplink carrier of carrier channels 402-408. For example, RF control circuit 308 may be configured to select the carrier channel with the lowest downlink retransmission rate as the highest quality uplink carrier channel. In this scenario, RF control circuit 308 may select carrier channel 406 as having the lowest retransmission rate, and accordingly may determine that carrier channel 406 is the highest-quality uplink carrier channel. RF control circuit 308 may then provide RF transceiver 304 with an indication of carrier channel 406 as the highest-quality channel.

RF control circuit 308 may additionally evaluate remaining available carrier channels 402, 404, and 408. For example, RF control circuit 308 may determine that carrier channel 402 has the second lowest retransmission rate, carrier channel 404 has the third lowest retransmission rate, and that carrier channel 408 has the lowest retransmission rate. Based on the retransmission rate, RF control circuit 308 may then identify carrier channel 402 as the second-highest quality channel, carrier channel 404 as the third-highest quality channel, and carrier channel 408 as the lowest-quality channel. RF control circuit 308 may accordingly provide RF transceiver 304 with an information indicating the relative quality of each channel respective to the other channels. RF control circuit 308 may thus provide RF transceiver 304 with a ranking of each of available carrier channels 402-408 based on channel quality.

As previously detailed, data buffer 310 may identify high-priority uplink data to be transmitted to base station 104, and may provide RF transceiver 304 with the identified high-priority data. RF transceiver 304 may then transmit the high-priority uplink data using carrier channel 406, thereby improving protection of the high-priority data during transmission.

Carrier analysis circuit 306 may additionally be configured to consider both uplink carrier channel and downlink carrier channel data simultaneously. For example, in the TDD scheme as detailed regarding FIG. 4, carrier analysis circuit 306 may calculate both an uplink retransmission rate and a downlink retransmission rate for each of available carrier channels 402-408. This may be performed according to the methods as previously detailed, i.e. by receiving ACK/NACK messages from base station 104 regarding data packets transmitted on the downlink path of each of carrier channels 402-408 as well as considering ACK/NACK messages transmitted to base station 104 over the uplink paths of carrier channels 402-408 regarding data packets received from base station 104. As previously described, the uplink and downlink retransmission rates may be calculated over a period of time, and thus may be average retransmission rates indicative of a mean retransmission rate over an extended time period. Carrier analysis circuit 306 may then provide RF control circuit 308 with an uplink retransmission rate and a downlink retransmission rate for each of available carrier channels 402-408. In such a TDD scheme, both downlink and uplink retransmission rates may be indicative of channel quality, and accordingly RF control circuit 308 may consider both the downlink and uplink retransmission rates in order to evaluate each available carrier channel 402-408. For example, RF control circuit 308 may calculate an overall retransmission rate by e.g. calculating a weighted sum of the downlink and uplink retransmission rate for each available carrier channel. RF control circuit 308 may weight each retransmission rate evenly, or may assign greater weight to either the downlink or uplink retransmission rate. RF control circuit 308 may then select the highest-quality carrier channel for uplink transmissions based on the combined uplink and downlink retransmission rates, and RF transceiver 304 may subsequently transmit high-priority data using the identified highest-quality channel as previously detailed.

In another exemplary aspect of the disclosure, UE 102 may take advantage of channel reciprocity in a TDD scheme in order to use received downlink signal power in order to evaluate the available uplink carrier channels. For example, UE 102 may calculate a received signal power for downlink signals received from base station 104 over the downlink paths of available carrier channels 402-408 in order to calculate a channel quality measure indicative of the uplink paths of carrier channels 402-408.

RF transceiver 304 may therefore receive radio frequency signals with antenna 302 from available carrier channels 402-408 and provide a resulting digitized signal to carrier analysis circuit 306. Carrier analysis circuit 306 may then calculate a received signal power from the resulting digitized signal and provide RF control circuit 308 with the calculated received signal power as a channel quality measure for each of available carrier channels. RF control circuit 308 may then select the highest-quality channel based on the calculated received signal powers.

Specifically, carrier analysis circuit 306 may calculate a Received Signal Code Power (RSCP) for each of carrier channels 402-408 in a UMTS implementation. RF transceiver 304 may thus provide carrier analysis circuit 306 with a digitized and demodulated signal, and carrier analysis circuit 306 may then calculate the RSCP for each of carrier channels 402-408. RF control circuit 308 may then determine the highest-quality channel based on which of carrier channels 402-408 has the highest-valued RSCP. In an alternative aspect of the disclosure, RF transceiver 304 may be additionally configured to measure an RSCP for the received radio frequency signal, and provide the resulting RSCP value to carrier analysis circuit 306.

Alternatively, carrier analysis circuit 306 may calculate a Reference Signal Received Power (RSRP) for each of carrier channels 402-408 in an LTE implementation. Similarly to the UMTS implementation described above, RF transceiver 304 may thus provide carrier analysis circuit 306 with a digitized and demodulated signal, and carrier analysis circuit 306 may then calculate the RSRP for each of carrier channels 402-408. RF control circuit 308 may then determine the highest-quality channel based on which of carrier channels 402-408 has the highest-valued RSRP. In an alternative aspect of the disclosure, RF transceiver 304 may be additionally configured to measure an RSRP for the received radio frequency signal, and provide the resulting RSRP value to carrier analysis circuit 306.

In another exemplary aspect of the disclosure, UE 102 may calculate a received signal quality for signals received over the downlink paths of available carrier channels 402-408 in order to obtain a channel quality measure for the uplink paths of carrier channels 402-408. For example, carrier analysis circuit 306 may calculate an $E_c/I_0$ (Energy per Chip/Interference) as the received signal quality for each of available carrier channels 402-408 based on downlink signals received over the downlink paths of available carrier channels 402-408 in a UMTS implementation. Alternatively, carrier analysis circuit 306 may calculate a Reference Signal Receive Quality (RSRQ) as the received signal quality for each of available carrier channels 402-408 based on downlink signals received over the downlink paths of available carrier channels 402-408 in an LTE implementation. Carrier analysis circuit 306 may then provide the calculated received signal qualities for each of for each of available carrier channels 402-408 to RF control circuit 308. As detailed regarding retransmission rates, BLER, and received signal powers, RF control circuit 308 may identify the highest-quality channel of available carrier channels 402-408 based on the received signal quality measures. For example, RF control circuit 308 may select the carrier channel of available carrier channels 402-408 with the highest received signal quality as the highest-quality channel. RF control circuit 308 may then provide RF transceiver 304 with the instruction that the uplink path of the selected carrier channel is to be used to transmit high-priority data. The high-priority data may be identified by data buffer 310 based on the types of data stored in data buffer 310. Data buffer 310 may then provide RF transceiver 304 with the high-priority data. RF transceiver 304 may then transmit the high-priority data using the highest-quality channel identified by RF control circuit 308.

It is noted that RSRQ and $E_c/I_0$ calculations may be based on a Received Signal Strength Indicator (RSSI), which may be calculated based on a modulated signal (i.e., before demodulation has occurred). Accordingly, RF transceiver 304 may either provide carrier analysis circuit 306 with the modulated signal to allow carrier analysis circuit 306 to measure the RSSI, or alternatively RF transceiver 304 may calculate the RSSI on the modulated signal and provide the resulting RSSI value to carrier analysis circuit 306.

UE 102 may therefore be able to utilize signals received over the downlink paths of available carrier channels 402-408 in order to identify a high-quality uplink carrier channel out of the plurality of available carrier channels 402-408, where the plurality of available carrier channels 402-408 are available as part of a multi-carrier uplink transmission scheme. It is understood that this approach may only be appropriate in situations that provide channel reciprocity between the uplink carrier channel and a downlink carrier channel, such as e.g. a TDD scheme using an identical carrier frequency for both uplink and downlink signal transmission. A UE utilizing TDD for uplink may therefore base the carrier channel analysis on either uplink signal or received downlink signals, and may consequently evaluate one or more of a received signal power, received signal strength, downlink retransmission rate, and/or downlink BLER.

Other duplexing schemes, such as Frequency Division Duplexing (FDD), may prevent the utilization of received downlink signals in order to evaluate uplink carrier channel quality. An FDD scheme may allocate separate carrier frequencies for uplink and downlink transmissions, and consequently channel reciprocity may not exist due to the resulting differences in uplink and downlink carrier channels. It may therefore not be feasible to base the carrier channel quality evaluation on received downlink signals, as the received downlink signals may not accurately reflect the uplink carrier channel. Accordingly, in an FDD implementation UE 102 may utilize the aforementioned uplink retransmission rate-based channel quality evaluation, e.g. by analyzing the rate of uplink retransmission requests that are requested by a connected base station regarding failed uplink packet transmissions or by estimating an uplink BLER based on ACK/NACKs received from base station 104 regarding failed uplink packet transmissions.

UE 102 may additionally or alternatively utilize transmission power headroom in order to evaluate each of the available uplink carrier channels. Power headroom refers to the remaining available transmission power left for a UE to use in addition to the power being used for the current transmission, i.e. the leftover transmission power before the UE reaches maximum transmit power. The maximum transmit power may be based on a network standard, and may further be determined by the serving base station. UE 102 may be configured to report the power headroom, e.g. as a power headroom report, to the serving base station, i.e. base station 104.

UE 102 may utilize power headroom as part of the carrier channel quality evaluation. For example, UE 102 may interpret large power headroom as indicative of satisfactory channel quality, and may interpret low power headroom as indicative of poor channel quality. Accordingly, UE 102 may be configured to identify carrier channels with large power headroom as high-quality channels, and carrier channels with low power headroom as low-quality channels.

RF transceiver 304 may have knowledge of the power headroom for each of the available carrier channels, e.g. by calculating the power headroom or analyzing power headroom reports, and may provide carrier analysis circuit 306 with the power headroom corresponding to each of the available carrier channels. Alternatively, another component of UE 102 (not shown) may provide carrier analysis circuit 306 with the power headroom for each of the available carrier channels. Carrier analysis circuit 306 may then provide the power headroom for each carrier channel to RF control circuit 308. In an alternative aspect, RF control circuit 308 may be directly provided with the power headroom for each available carrier channel by another component.

RF control circuit 308 may then perform an analysis on the power headroom values for each of the available uplink carrier channels in order to identify the highest-quality carrier channel. For example, RF control circuit 306 may be configured to select the carrier channel with the largest power headroom value as the highest-quality channel. RF control circuit 308 may then provide RF transceiver 304 with an indication of the highest-quality channel, and RF transceiver 304 may then transmit high-priority data obtained from data buffer 310 using the highest-quality channel. UE 102 may thus offer strong protection to the high-priority data.

In an exemplary scenario regarding FIG. 4, UE 102 may be currently performing uplink transmissions using a multi-carrier scheme with carrier channels 402-408 as available carrier channels. UE 102 may calculate the power headroom for each of available carrier channels 402-408. For example, carrier analysis circuit 308 may receive a power headroom report or other information indicating the power headroom of each channel from RF transceiver 304 or another internal component of UE 102. Carrier analysis circuit 308 may then determine the power headroom for each of available carrier channels 402-408. Carrier analysis circuit 306 may then provide RF control circuit 308 with the power headroom values for each of available carrier channels 402-408. RF control circuit 308 may then select a high-quality carrier channel from available carrier channels 402-408 based on the received power headroom values. For example, carrier channel 402 may have a high power headroom, while available carrier channels 404, 406, and 408 may have low power headroom. RF control circuit 308 may be configured to select the carrier channel from available carrier channels 402-408 with the largest power headroom as the highest-quality channel. In the presented exemplary scenario, RF control circuit 308 may select carrier channel 402 as the highest-quality channel, as carrier channel 402 has the largest power headroom. As detailed in regarding previous aspects of the disclosure, RF control circuit 308 may provide RF transceiver 304 with an indication that carrier channel 402 has been selected as the highest-quality channel. RF transceiver 304 may then transmit high-priority data received from data buffer 310 using carrier channel 402. RF transceiver 304 may then transmit lower-priority data identified by data buffer 310 as being low-priority using one of lower-quality available carrier channels 404, 406, or 408.

It is understood that more than one of the above-detailed channel quality evaluation criteria may be used concurrently to evaluate the carrier channel quality of each of the available carrier channels. For example, a UE implementing an FDD scheme (i.e., where channel reciprocity does not exist) may be configured to consider both uplink retransmission rate (or BLER derived from retransmission rate) and power headroom in order to evaluate each of the available carrier channels. For example, carrier analysis circuit 306 may be configured to determine both a retransmission rate and power headroom value for each of available carrier channels 402-408, and provide the retransmission rates and power headroom values to RF control circuit 308. RF control circuit 308 may then select the highest-quality carrier channel from available carrier channels 402-408 by concurrently considering both the retransmission rate and the power headroom value for each of available carrier channels 402-408. RF control circuit 308 may e.g. rank available carrier channels 402-408 by considering both retransmission rate and power headroom to select the highest-quality carrier channel. RF control circuit 308 may either consider both retransmission rate and power headroom equivalently, or may weight one criteria higher than the other.

TDD schemes offer the possibility to consider numerous two channel quality evaluation criteria. As previously detailed, TDD schemes allow the use of downlink signals received on downlink carrier channels sharing the same carrier frequency as uplink carrier channels to evaluate uplink carrier channels, such as e.g. downlink retransmission rate, received downlink signal power, and received downlink signal quality. The additional criteria offered by TDD schemes may be used concurrently with one or more of the uplink channel-exclusive criteria (i.e. uplink retransmission rate and power headroom).

For example, a UE implementing a TDD scheme may utilize two or more of uplink retransmission rate (or uplink BLER), downlink retransmission rate (or downlink BLER), power headroom, received signal power, and received signal quality in order to evaluate uplink carrier channel quality and select a highest-quality uplink carrier channel. RF control circuit 308 may thus be configured to consider the aforementioned multiple criteria in order to select the highest-quality uplink carrier channel. RF control circuit 308 may be configured to consider the multiple criteria equivalently or to place higher weight on one or more of the multiple criteria. For example, RF control circuit 308 may place higher weight on uplink channel-exclusive criteria (i.e. uplink retransmission rate and power headroom) than on downlink channel-based criteria (i.e. downlink retransmission rate, received signal power, and received signal quality). RF control circuit 308 may be configured to rank each of the available carrier channels based on an algorithm that considers multiple criteria, and select the highest-ranked channel as the highest-quality channel. The algorithm may be adapted to consider one or more of the multiple criteria with greater weight than other of the multiple criteria.

UE 102 may additionally be configured to utilize time-averaged values of the uplink criteria in order to evaluate the available carrier channels. For example, in either a single or multiple criteria implementation UE 102 may calculate a windowed average of the channel quality evaluation criteria, and then may select the highest-quality carrier channel based on the windowed average. For example, carrier analysis circuit 306 may be configured to calculate a mean uplink/downlink retransmission rate, mean power headroom, mean received signal power, and/or mean received signal quality, and provide the resulting mean values to RF control circuit 308. RF control circuit 308 may then select the highest-quality channel in a substantially similar manner to as previously detailed (e.g. selecting the carrier channel with the highest-valued evaluation criteria or highest-ranked carrier channel based on a multiple-criteria algorithm). The mean values may be calculated based on a selected time window, where the selected time window may be individually selected for each channel quality criteria based on the particular channel quality criteria being used. Utilizing mean values for highest-quality channel selection may prevent instantaneous fluctuations in one or more of the channel quality evaluation criteria from leading to an improper carrier channel being selected as the highest-quality carrier channel.

UE 102 may be configured to implement the above-detailed process as an ongoing process, i.e. where a highest-quality channel is being continuously selected. For example, UE 102 may be configured to select a highest-quality channel, perform uplink transmission according to the selected highest-quality channel, and then re-evaluate the available uplink carrier channels in order to select a new (or maintain the same depending on the channel evaluation results) highest-quality channel.

UE 102 may have hysteresis measures in place in order to prevent unnecessarily rapid switching of highest-quality channel. For example, it may be undesirable for UE 102 to be continuously switching the selection of the highest-quality channel with which to transmit the high-priority data. Accordingly, UE 102 may be configured to only evaluate the available carrier channels during certain periodic evaluation time intervals, where the selected highest-quality channel will be utilized to transmit the high-priority data without change between the periodic evaluation time intervals. UE 102 may then re-evaluate the available carrier channels using the selected channel evaluation criteria in order to identify the current highest-quality channel during the next periodic evaluation time interval, and then utilize the current highest-quality channel to transmit high-priority data for until the next periodic evaluation time interval.

UE 102 may additionally be configured to only switch highest-quality channels if the newly identified highest-quality channel offers a significant improvement over the previous highest-quality channel. For example, UE 102 may be configured to utilize received signal power as the channel evaluation criteria. UE 102 may select a first carrier channel with the highest received signal power as the highest quality channel, and transmit high-priority uplink data using the first carrier channel for a first time period. UE 102 may then evaluate the available carrier channels based on received signal power after the first time period has ended, and select a new carrier channel that now has a higher received signal power than the first carrier channel. However, the new carrier channel may only have a slightly higher received signal power than the first carrier channel, and accordingly UE 102 may continue to transmit high-priority uplink data using the first carrier channel during a second time period instead of switching to utilizing the new carrier channel. UE 102 may thus prevent unnecessarily rapid switching between selected highest-quality carrier channels.

UE 102 may additionally be configured with further functionality regarding the identification of high-priority data. For example, UE 102 may identify all uplink data scheduled to be transmitted to the serving base station. UE 102 may then rank all uplink data according to priority, e.g. with high-priority data (protocol control signaling, streaming data, ACK/NACKs) ranked higher than other, lower-priority data. UE 102 may include additional criteria in order to rank lower-priority data, e.g. dependent on the exact types of lower-priority data.

UE 102 may thus obtain a ranked list of all uplink data scheduled to be transmitted to the serving base station, where the list is ranked from highest-priority to lowest-priority. This functionality may be e.g. performed by data buffer 310.

UE 102 may be additionally configured to rank all available uplink carrier channels based on the selected carrier channel evaluation criteria. For example, UE 102 may be implementing a multi-carrier scheme utilizing carrier channels 402-408 as available uplink carrier channels. UE 102 may rank available carrier channels 402-408 by channel quality according to the methods previously described above. For example, UE 102 may rank carrier channel 404 as having the highest quality, carrier channel 402 as having the second highest quality, carrier channel 406 as having the third highest channel quality, and carrier channel 408 as having the lowest channel quality.

UE 102 may then transmit as much of the high-priority data possible using carrier channel 404. If carrier channel 404 does not have sufficient capacity to transmit all of the high priority data, UE 102 may utilize carrier channel 402, which had the second highest channel quality, to transmit the remaining high-priority data. If carrier channel 404 has leftover space after allocating the necessary capacity for the high-priority data, the next highest-priority data may also be transmitted on carrier channel 404. UE 102 may thus transmit the highest-priority data using the highest-quality channel available.

Accordingly, UE 102 may include a data analysis circuit (e.g. data buffer 310) configured to identify at least first uplink data and second uplink data, wherein the first uplink data has a higher transmission priority than the second uplink data. UE 102 may also include a channel evaluation circuit (e.g. carrier analysis circuit 306) configured to evaluate a plurality of candidate uplink channels to generate a plurality of uplink channel quality measures, where each of the plurality of uplink channel quality measures is associated with one of the plurality of candidate uplink channels. UE 102 may additionally include a channel selection circuit (e.g. RF control circuit 308) configured to perform a comparison between one or more of the plurality of uplink channel quality measures to select a first uplink channel from the plurality of candidate uplink channels. UE 102 may further include a transmitter (e.g. RF transceiver 304) configured to transmit the first uplink data using the first uplink channel, and to transmit the second uplink data using a second uplink channel of the plurality of candidate uplink channels. In an alternative configuration, UE 102 may be similarly configured to include a data analysis circuit (e.g. data buffer 310), a channel evaluation circuit (e.g. carrier analysis circuit 306), a channel selection circuit (e.g. RF control circuit 308), and a transmitter (e.g. RF transceiver 304). The data analysis circuit may be configured to identify first uplink data and second uplink data, wherein the first uplink data has a higher transmission priority than the second uplink data. The channel evaluation circuit may be configured to generate a plurality of uplink channel quality measures based on received data, wherein each of the plurality of uplink channel quality measures represents a channel quality of one of a plurality of candidate uplink channels. The channel selection circuit may be configured to select a first uplink channel from the plurality of candidate uplink channels based on the plurality of uplink channel quality measures. The transmitter may be configured to transmit the first uplink data using the first uplink channel, and transmit the second uplink data using a second uplink channel of the plurality of candidate uplink channels.

Figure 5A:
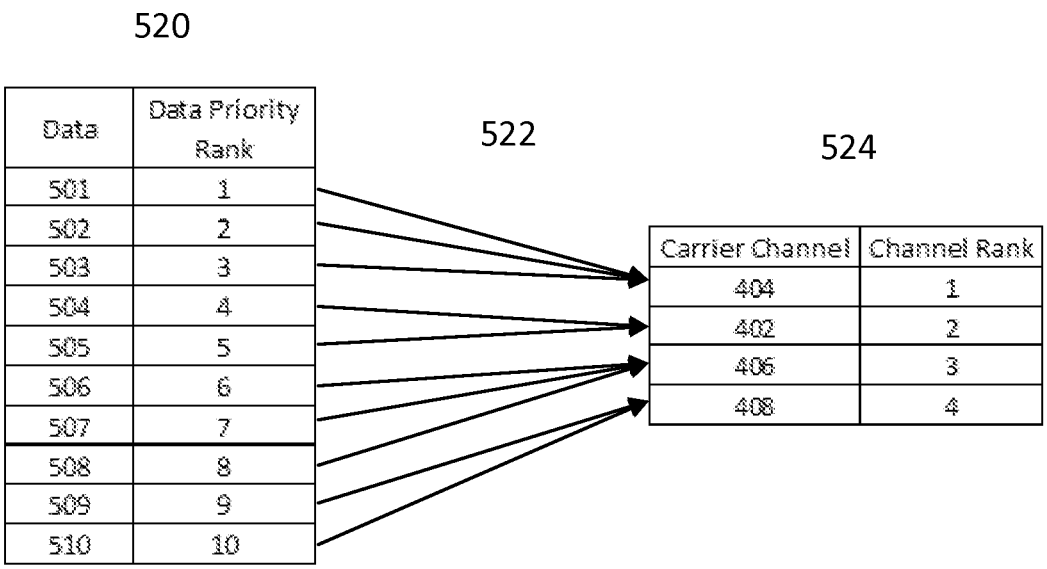
FIGS. 5A and 5B show exemplary channel mappings using four available uplink carrier channels.
Figure 5B:
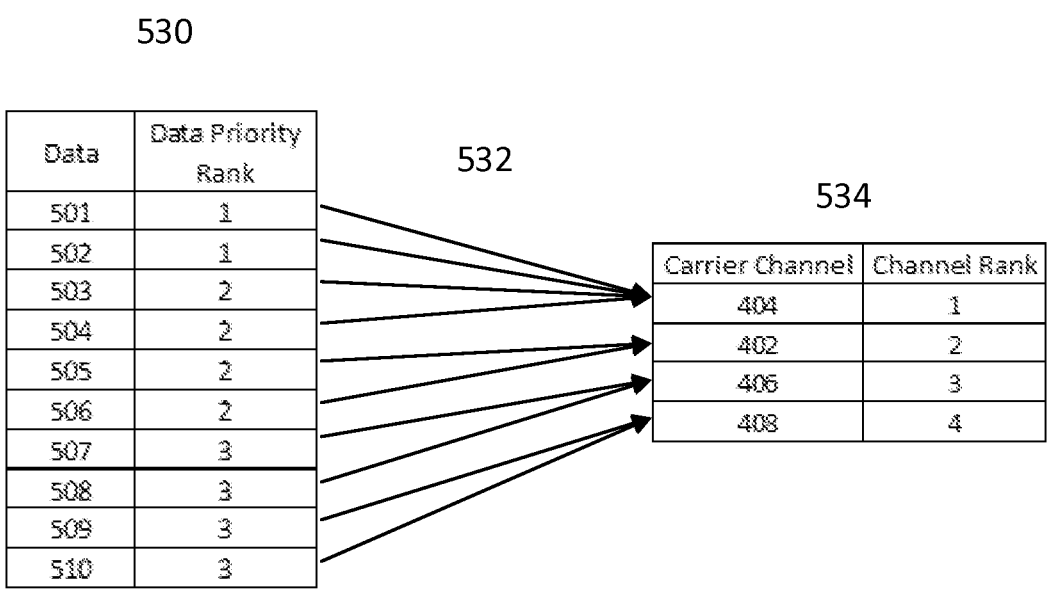

FIGS. 5A and 5B further illustrate the above-described example with respect to the internal components of UE 102 (RF transceiver 304, carrier analysis circuit 306, RF control circuit 308, data buffer 310). Data buffer 310 may identify ten data blocks 501-510 scheduled for uplink transmission to base station 104. As shown in table 520, data buffer 310 may rank data blocks 501-510 according to priority (from highest to lowest), i.e. by giving high priority to protocol control signaling, streaming data, and ACK/NACK messages. Carrier analysis circuit 306 may provide RF control circuit 308 with channel quality measures associated with each of available carrier channels 402-408. RF control circuit 308 may then perform a channel quality analysis on available carrier channels 402-408 in order to rank available carrier channels 402-408 according to channel quality (from highest to lowest).

After ranking data blocks 501-510, data buffer 310 may provide RF transceiver 304 with data blocks 501-510 along with the associated data rankings (i.e. from 1-10, with 1 indicating the highest priority). RF control circuit 308 may provide RF transceiver 304 with the ranking for each of available carrier channels 402-408. RF transceiver 304 may then map each of data blocks 501-510 to available carrier channels 402-408 in order to transmit data blocks 501-510 to base station 104.

Mapping paths 522 show an exemplary mapping of data blocks 501-510 to available carrier channels 402-408 as performed by RF transceiver 304. Alternatively, an additional scheduling circuit (not shown) may be provided in UE 102 to handle the mapping of data blocks 501-510 to available carrier channels 402-408. Mapping paths 522 may be dependent on the available capacity of each of carrier channels 402-408 in addition to the size of data blocks 501-510. It is noted that FIGS. 5A-5B have been simplified for purposes of explanation, and are intended as a purely exemplary representation of how data blocks may be mapped to available uplink channels.

RF transceiver 304 may thus match the highest-priority remaining data to the highest-quality available channel, and proceed until all of data blocks 501-510 have been allocated to one of available carrier channels 402-408. As shown by mapping paths 522, highest-quality carrier channel 404 may only have the available capacity to transmit data blocks 501-503. Accordingly, data blocks 501-503 may be mapped to carrier channel 404. RF transceiver 304 may then continue with mapping the remaining data blocks 504-510. As shown by mapping paths 522, the second-highest quality carrier channel, carrier channel 402, may have the capacity to transmit data blocks 504 and 505, and RF transceiver 304 may map data blocks 504 and 505 to carrier channel 402. RF transceiver 304 may then map the remaining data blocks 506-510 to carrier channels 406 and 408 in a similar manner.

After mapping data blocks 501-510 to available carrier channels 402-408, RF transceiver 304 may transmit each of data blocks 501-510 on the assigned carrier channel. Accordingly, the highest-priority data may be transmitted using the highest-quality channel, and the next-highest priority data may be transmitted using the highest-quality available channel.

As opposed to allocating an individual ranking to each of data blocks 501-510, data buffer 310 may group each of data blocks 501-510 in a "priority group". For example, data buffer 310 may be configured to assign each of data blocks 501-510 a priority group based on the data type. For example, data blocks that contain protocol control signaling, streaming data, or ACK/NACK messages may be assigned to a "high-priority" group. Other data blocks that are important but not as essential to UE 102 as the "high-priority" data blocks may be assigned to a "medium-priority" group. Finally, the remaining data blocks may be assigned to a "low-priority" group. Data buffer 310 may thus group each data block 501-510 to one of the "high", "medium", or "low" priority groups, and then utilize the assigned "priority group" in order to map data blocks 501-510 to the highest-quality carrier channel available.

FIG. 5B shows an exemplary priority grouping and channel mapping of data blocks 501-510. As shown in table 530, data buffer 310 may assign each of data blocks 501-510 a priority group from 1 to 3, where 1 denotes the "high priority" group, 2 denotes the "medium priority" group, and 3 denotes the "low priority" group. Data blocks 501 and 502 may be high-priority data, e.g. protocol control signaling, streaming data, and/or ACK/NACK messages, and may consequently be assigned the "high priority" group. Available carrier channels 402-408 may be ranked similarly as to in FIG. 5A, i.e. by RF control circuit 308.

RF transceiver 304 may then receive data blocks 501-510 along with the corresponding priority group for each data block. RF transceiver 304 may also receive the channel ranks for each of available carrier channels 402-408, and may then map data blocks 501-510 to available carrier channels 402-408 as denoted by mapping paths 532. As shown by mapping paths 532, "high priority" data blocks 501 and 502 may be mapped to the highest-quality channel, carrier channel 404. Carrier channel 404 may have additional capacity remaining, and RF transceiver 304 may then additionally map "medium priority" data blocks 503 and 504 to carrier channel 404. The remaining "medium priority" data blocks 505 and 506 may be allocated to second-highest quality carrier channel 402, and "low priority" data blocks 507-510 may be mapped to carrier channels 406 and 408 depending on the available channel capacity of each carrier channel. RF transceiver 304 may then transmit data blocks 501-510 on available carrier channels 402-408 according to mapping paths 532. UE 102 may thus offer the highest protection in transmission to the "high priority" data, while still offering moderate protection to the remaining important data.

FIGS. 6A and 6B show an exemplary channel mapping for uplink data utilizing available uplink carrier channels 202 and 204 as shown in FIG. 2. It is noted that the following examples have been simplified for purposes of explanation.

As shown in FIG. 6A, UE 102 may identify data bocks 601-610 as uplink data scheduled to be transmitted. UE 102 may identify carrier channels 202 and 204 as available uplink carrier channels.

Carrier analysis circuit 306 may perform a channel quality analysis on carrier channels 202 and 204 and provide channel quality measures for carrier channels 202 and 204 to RF control circuit 308. RF control circuit 308 may evaluate the channel quality measures and determine that carrier channel 204 has a higher channel quality than carrier channel 202.

Data buffer 310 may analyze data blocks 601-610 in order to rank each of data blocks 601-610 according to transmission priority. For example, data buffer 310 may rank data blocks 601-610 as detailed in table 620.

RF transceiver 304 may then map each of data blocks 601-610 to one of available carrier channels 202 or 204. However, carrier channels 202 and 204 may have insufficient capacity to transmit all of data blocks 601-610 simultaneously, i.e. during a single transmission time period. RF transceiver 304 may therefore need to map data blocks 601-610 onto carrier channels 202 and 204 over multiple time periods.

As shown in table 624, RF transceiver may map high-priority data blocks 601-603 to highest-quality carrier channel 204 during time period 1. RF transceiver 304 may also map data block 604 to carrier channel 202 during time period 1. However, carrier channels 202 and 204 may not have any remaining available capacity during time period 1 (e.g. dependent on the size of data blocks 601-604 and the individual capacity of each carrier channel 202 and 204), and consequently RF transceiver 304 may need to utilize further time periods 2 and 3 in order to transmit remaining data blocks 605-610.

As shown by channel mappings 622, RF transceiver 304 may proceed to fill available carrier channels 204 and 202 during time periods 2 and 3 with data blocks 605-610 in order to transmit all data blocks 601-610. RF transceiver 304 may e.g. identify the highest-priority remaining data block of data blocks 601-610 at the beginning of each period, and fill highest-quality channel 204 with as many of highest-priority remaining data blocks as possible. RF transceiver 304 may then fill low-quality channel 202 to capacity with the next-highest priority data blocks remaining until low-quality channel 202 is also filled to capacity. RF transceiver 304 may transmit the data during the time period, and repeat the process during the following time period.

FIG. 6B shows an exemplary modified channel mapping. As shown in table 630, data blocks 601-610 may be ranked according to priority in a similar manner as to in table 620 of FIG. 6A. Available carrier channels 202 and 204 may be similarly ranked according to quality as in table 624 of FIG. 6A, where carrier channel 204 has been identified as having a higher channel quality than carrier channel 202.

FIG. 6A detailed channel mapping 622 illustrating where RF transceiver 304 filled available carrier channels 202 and 204 during each of time periods 1-3, where the highest-priority remaining data blocks of data blocks 601-610 were transmitted using carrier channel 204 during each time period and the next-highest priority data blocks were transmitted using carrier channel 202. Accordingly, the highest-priority data was transmitted first in time, while the lowest-priority data was transmitted last in time. In contrast, RF transceiver 304 may desire to send high-priority data on high-quality channel 204, even if doing so will result in high-priority data being transmitted at a later time.

As shown by channel mappings 632, carrier channel 204 may only be capable of transmitting highest-priority data block 601 during time period 1. Carrier channel 202 may be capable of transmitting second-highest priority data 602 during time period 1; however, RF transceiver 304 may decide to delay transmission of second-highest priority data 602 until time period 2 in order to transmit second-highest priority data on highest-quality carrier channel 204. Accordingly, RF transceiver 304 may transmit data blocks 604 and 605 on lower-quality channel 202 during time period 1. RF transceiver 304 may then transmit high-priority data blocks 602 and 603 using high-quality channel 204 during time period 2, thereby allowing better protection of high-priority data blocks 602 and 603 during transmission. RF transceiver 304 may then transmit remaining data blocks 606-610 according to the best available channel per time period as detailed by channel mappings 632, i.e. similarly to as performed by channel mappings 622. RF transceiver 304 may alternatively continue to withhold transmission of the highest-priority remaining data blocks in order to ensure transmission by the highest-quality channel (not shown).

RF transceiver 304 may be configured to map data blocks to carrier channels according to a variety of different and alternative methods and criteria, and the exemplary channel mappings detailed herein are not intended to represent the full-scope of possible approaches to map high-priority data to high-quality channels. It is also noted that, as previously disclosed, UE 102 may be configure to re-evaluate available carrier channels 202 and 204 over certain periodic time intervals, and accordingly the identified highest-quality channel may change over time. Although this exemplary scenario is not detailed in FIGS. 6A and 6B, it is understood that such an approach may involve mapping high-priority data to the available carrier channel ranked "1" as denoted in tables 624 and 634

In addition to the aforementioned aspects, UE 102 may be additionally configured to receive feedback information regarding one or more of the available carrier channels from the serving base station, e.g. base station 104. While this implementation may require changes to existing network standards, feedback information from base station 104 may offer a further criteria that UE 102 may utilize in order to evaluate available uplink carrier channels.

For example, UE 102 may be exchanging data with base station 104 using a multi-carrier uplink scheme with carrier channels 402-404 available as uplink carrier channels as detailed above. UE 102 may be configured to select high-priority data, and to transmit the high-priority data using one of available carrier channels 402-408 identified as having the highest channel quality. Base station 104 may perform signal power and/or signal quality measurements on signals received on the uplink paths of available carrier channels 402-408, and may then transmit the measured signal power and/or signal quality measurements as feedback information to mobile terminal 102 (e.g. using the downlink path of one or more of available carrier channels 402-408). UE 102 may receive the feedback information, and may subsequently provide the feedback information to RF control circuit 308 in the form of a channel quality measure. RF control circuit 308 may then perform a channel quality analysis based on the signal power and/or signal quality information provided by base station 104. For example, RF control circuit 308 may select the carrier channel of available carrier channels 402-408 having the highest channel quality measure (e.g. highest signal power or highest signal quality) as the highest-quality channel. Alternatively, RF control circuit 308 may rank available carrier channels 402-408 as detailed regarding FIGS. 5A and 5B, or may perform a channel quality evaluation using multiple criteria including the received feedback information. RF control circuit 308 may therefore base the identification of the highest-quality channel on the received feedback information, and select a carrier channel from available carrier channels 402-408 with which to transmit high-priority data.

Figure 7:
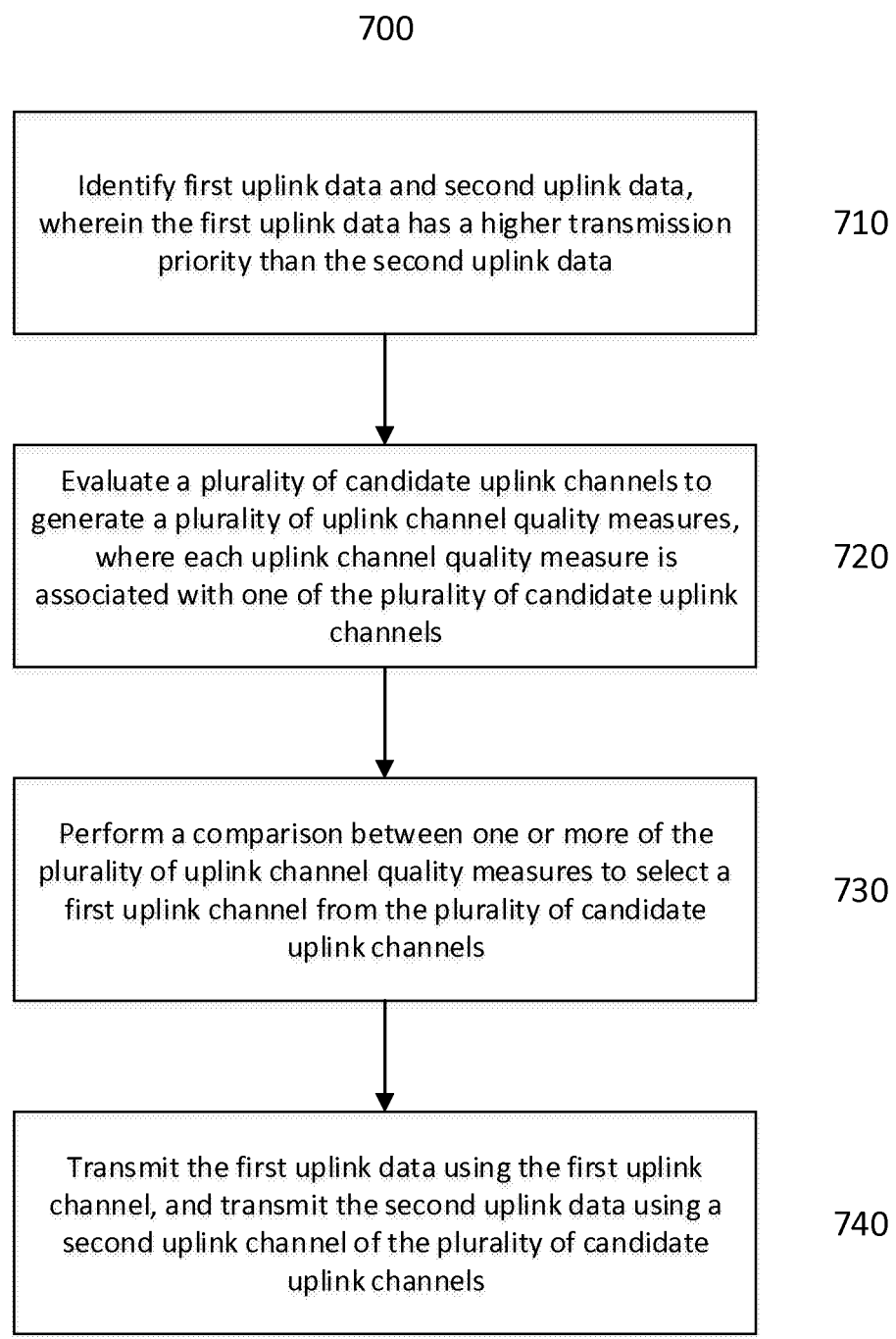
FIG. 7 illustrates a method for performing uplink mobile communications according to an exemplary aspect of the disclosure.

FIG. 7 shows a method 700 for performing uplink mobile communications according to an exemplary aspect of the disclosure.

In 710, method 700 may identify first uplink data and second uplink data. The first uplink data may have a higher transmission priority than the second uplink data. Method 700 may then evaluate a plurality of candidate uplink channels to generate a plurality of uplink channel quality measures in 720. Each uplink channel quality measure may be associated with one of the plurality of candidate uplink channels. Method 700 may then perform a comparison between one or more of the plurality of uplink channel quality measures to select a first uplink channel from the plurality of candidate uplink channels in 730. Finally, method 700 may transmit the first uplink data using the first uplink channel, and transmit the second uplink data using a second uplink channel of the plurality of candidate uplink channels in 740.

Figure 8:
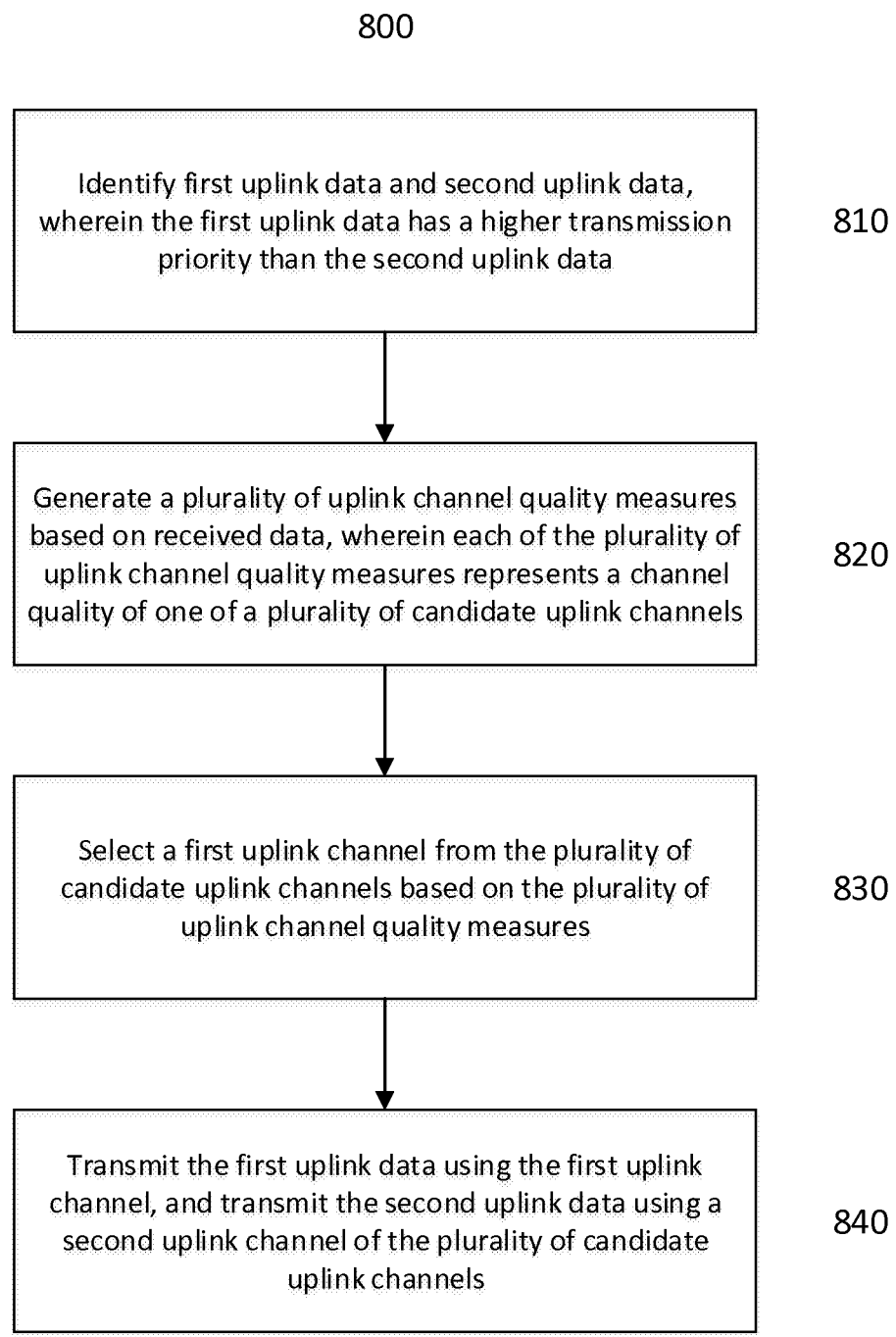
FIG. 8 illustrates a method for performing uplink mobile communications according to another exemplary aspect of the disclosure.

FIG. 8 shows a method 800 for performing uplink mobile communications according to another exemplary aspect of the disclosure.

Method 800 may identify first uplink data and second uplink data in 810. The first uplink data may have a higher transmission priority than the second uplink data. Method 800 may then generate a plurality of uplink channel quality measures based on received data in 820. Each of the plurality of uplink channel quality measures may represent a channel quality of one of a plurality of candidate uplink channels. In 830, method 800 may select a first uplink channel from the plurality of candidate uplink channels based on the plurality of uplink channel quality measures. Method 800 may then transmit the first uplink data using the first uplink channel, and transmit the second uplink data using a second uplink channel of the plurality of candidate uplink channels in 840.

The number of uplink carriers may vary according to the particular scheme being implemented. For example, 3GPP-specified multiple carrier schemes such as Dual-Carrier High Speed Uplink Packet Access (DC-HSUPA, also known as Dual-Cell HSUPA), Multi-Carrier HSUPA, or uplink carrier aggregation schemes may provide anywhere from two to eight uplink carrier four channels. The aforementioned disclosure is understood as being applicable to any such carrier scheme that utilizes multiple uplink carrier channels.

The following examples pertain to further aspects of this disclosure:

Example 1 is a method for performing uplink mobile communications. The method includes identifying first uplink data and second uplink data, wherein the first uplink data has a higher transmission priority than the second uplink data. The method further includes evaluating a plurality of candidate uplink channels to generate a plurality of uplink channel quality measures, where each of the plurality of uplink channel quality measures is associated with one of the plurality of candidate uplink channels; performing a comparison between one or more of the plurality of uplink channel quality measures to select a first uplink channel from the plurality of candidate uplink channels; transmitting the first uplink data using the first uplink channel; and transmitting the second uplink data using a second uplink channel of the plurality of candidate uplink channels.

In Example 2, the subject matter of Example 1 can optionally include wherein the first uplink channel is associated with a higher uplink channel quality measure than the second uplink channel.

In Example 3, the subject matter of Example 1 or 2 can optionally include wherein the first uplink data has a higher transmission priority than the second uplink data based on the type of data contained in the first uplink data and second uplink data.

In Example 4, the subject matter of Examples 1 to 3 can optionally include selecting the second uplink channel based on the plurality of uplink channel quality measures.

In Example 5, the subject matter of Examples 1 to 3 can optionally include wherein the first uplink data includes one of protocol control signaling data, streaming data, acknowledgement (ACK) messages, or non-acknowledgement (NACK) messages.

In Example 6, the subject matter of Examples 1 to 5 can optionally include selecting the first uplink data and second uplink data from a group of uplink data scheduled for uplink transmission.

In Example 7, the subject matter of Example 6 can optionally include ranking each uplink data in the group of uplink data according to transmission priority, wherein the first uplink data is associated with a higher transmission priority than the second uplink data.

In Example 8, the subject matter of Examples 1 to 7 can optionally include wherein the plurality of uplink channel quality measures include at least one of an uplink retransmission rate, downlink retransmission rate, uplink block error rate, downlink block error rate, received signal power, received signal quality, or power headroom.

In Example 9, the subject matter of Example 8 can optionally include receiving data from a base station; and calculating the plurality of uplink channel quality measures based on the received data.

In Example 10, the subject matter of Example 8 can optionally include wherein the evaluating a plurality of candidate uplink channels generate a plurality of uplink channel quality measures includes determining a single uplink channel quality measure for each of the plurality of candidate uplink channels.

In Example 11, the subject matter of Example 8 can optionally include wherein the evaluating a plurality of candidate uplink channels generate a plurality of uplink channel quality measures includes determining a plurality of uplink channel quality measures for each of the plurality of candidate uplink channels.

In Example 12, the subject matter of Example 11 can optionally include wherein the performing a comparison between one or more of the plurality of uplink channel quality measures to select a first uplink channel includes ranking each of the plurality of candidate uplink channels according to the plurality of uplink channel quality measures associated with each of the plurality of candidate uplink channels.

In Example 13, the subject matter of Example 12 can optionally include selecting the first uplink data and second uplink data from a group of uplink data scheduled for uplink transmission, ranking the uplink data in the group of uplink data by transmission priority according to a content of the uplink data, and transmitting each uplink data of the group of uplink data on the highest-ranked available candidate uplink channel of the plurality of candidate uplink channel based on the transmission priority of each uplink data of the group of uplink data.

In Example 14, the subject matter of Example 13 can optionally include wherein the ranking the uplink data in the group of uplink data by transmission priority according to a content of the uplink data includes ranking uplink data that includes protocol control signaling, streaming data, and ACK/NACK messages as having a higher transmission priority than other uplink data.

In Example 15, the subject matter of Example 8 can optionally include wherein the uplink mobile communications are performed according to a time division duplex scheme.

In Example 16, the subject matter of Example 15 can optionally include wherein at least one of the plurality of uplink channels shares a common carrier frequency with a downlink channel, and wherein at least one of the plurality of uplink channel quality measures is calculated based on signals received on the downlink channel.

In Example 17, the subject matter of Example 8 can optionally include wherein the uplink mobile communications are performed according to a frequency division duplex scheme, and wherein the uplink channel quality measures include at least one of an uplink retransmission rate, uplink block error rate, or power headroom.

In Example 18, the subject matter of Examples 1 to 10 can optionally include wherein the performing a comparison between one or more of the plurality of uplink channel quality measures to select a first uplink channel includes selecting the candidate uplink channel of the plurality of candidate uplink channels with the highest channel quality measure as the first uplink channel.

In Example 19, the subject matter of Example 1 can optionally include receiving uplink feedback information from a base station; and using the uplink feedback information as the plurality of uplink channel quality measures.

In Example 20, the subject matter of Example 19 can optionally include wherein the uplink feedback information includes an uplink signal power or an uplink signal quality measured by the base station.

In Example 21, the subject matter of Examples 1 to 20 can optionally include wherein the at least one of the plurality of uplink channel quality measures is a time-averaged value.

In Example 22, the subject matter of Examples 1 to 21 can optionally include wherein the candidate uplink channels are available as part of a multiple uplink carrier channel scheme.

In Example 23, the subject matter of Example 22 can optionally include wherein the candidate uplink channels are available as part of an uplink carrier aggregation scheme according to a Long Term Evolution (LTE) network standard.

In Example 24, the subject matter of Example 22 can optionally include wherein the candidate uplink channels are available as part of a dual carrier, dual cell, or multiple carrier uplink High Speed Packet Access (HSPA) scheme according to a Universal Mobile Telecommunications System (UMTS) network standard.

Example 25 is a method for performing uplink mobile communications. Example 25 includes identifying first uplink data and second uplink data, wherein the first uplink data has a higher transmission priority than the second uplink data; generating a plurality of uplink channel quality measures based on received data, wherein each of the plurality of uplink channel quality measures represents a channel quality of one of a plurality of candidate uplink channels; selecting a first uplink channel from the plurality of candidate uplink channels based on the plurality of uplink channel quality measures; transmitting the first uplink data using the first uplink channel; and transmitting the second uplink data using a second uplink channel of the plurality of candidate uplink channels.

In Example 26, the subject matter of Example 25 can optionally include wherein the first uplink channel is associated with a higher uplink channel quality measure than the second uplink channel.

In Example 27, the subject matter of Example 25 or 26 can optionally include wherein the first uplink data is determined to have a higher transmission priority than the second uplink data based on the type of data contained in the first uplink data and second uplink data.

In Example 28, the subject matter of Examples 25 to 27 can optionally include selecting the second uplink channel based on the plurality of uplink channel quality measures.

In Example 29, the subject matter of Examples 25 to 27 can optionally include wherein the first uplink data includes one of protocol control signaling data, streaming data, acknowledgement (ACK) messages, or non-acknowledgement (NACK) messages.

In Example 30, the subject matter of Examples 25 to 29 can optionally include selecting the first uplink data and second uplink data from a group of uplink data scheduled for uplink transmission.

In Example 31, the subject matter of Example 30 can optionally include ranking each uplink data in the group of uplink data according to transmission priority, wherein the first uplink data is associated with a higher transmission priority than the second uplink data.

In Example 32, the subject matter of Examples 25 to 31 can optionally include wherein the received data is received from a base station, and wherein the uplink channel quality measures include at least one of an uplink retransmission rate, downlink retransmission rate, uplink block error rate, downlink block error rate, received signal power, received signal quality, or power headroom.

In Example 33, the subject matter of Example 32 can optionally include wherein the uplink channel quality measure is calculated based on the received data.

In Example 34, the subject matter of Example 32 can optionally include wherein the generating a plurality of uplink quality channel measures based on received data includes determining a single uplink channel quality measure for each of the plurality of candidate uplink channels based on the received data.

In Example 35, the subject matter of Example 32 can optionally include wherein the generating a plurality of uplink quality channel measures based on received data includes determining a plurality of uplink channel quality measures for each of the plurality of candidate uplink channels based on the received data.

In Example 36, the subject matter of Example 35 can optionally include wherein the selecting a first uplink channel from the plurality of uplink channels includes ranking each of the plurality of candidate uplink channels according to the plurality of uplink channel quality measures associated with each of the plurality of candidate uplink channels.

In Example 37, the subject matter of Example 36 can optionally include selecting the first uplink data and second uplink data from a group of uplink data scheduled for uplink transmission, ranking the uplink data in the group of uplink data by transmission priority according to a content of the uplink data, and transmitting each uplink data of the group of uplink data on the highest-ranked available candidate uplink channel of the plurality of candidate uplink channel based on the transmission priority of each uplink data of the group of uplink data.

In Example 38, the subject matter of Example 37 can optionally include wherein the ranking the uplink data in the group of uplink data by transmission priority according to a content of the uplink data includes ranking uplink data that includes protocol control signaling, streaming data, and ACK/NACK messages as having a higher transmission priority than other uplink data.

In Example 39, the subject matter of Example 32 can optionally include wherein the uplink mobile communications are performed according to a time division duplex scheme.

In Example 40, the subject matter of Example 39 can optionally include wherein at least one of the plurality of uplink channels shares a common carrier frequency with a downlink channel, and wherein the received data is received over the downlink channel.

In Example 41, the subject matter of Example 32 can optionally include wherein the uplink mobile communications are performed according to a frequency division duplex scheme, and wherein the uplink channel quality measures include at least one of an uplink retransmission rate, uplink block error rate, or power headroom.

In Example 42, the subject matter of Example 25 can optionally include wherein the selecting a first uplink channel from the plurality of candidate uplink channels includes selecting the candidate uplink channel of the plurality of candidate uplink channels with the highest channel quality measure as the first uplink channel.

In Example 43, the subject matter of Example 25 can optionally include receiving uplink feedback information from a base station; and wherein the generating a plurality of uplink channel quality measures includes using the uplink feedback information as the plurality of uplink channel quality measures.

In Example 44, the subject matter of Example 43 can optionally include wherein the uplink feedback information includes an uplink signal power or an uplink signal quality measured by the base station.

In Example 45, the subject matter of Examples 25 to 32 can optionally include wherein at least one of the plurality of uplink channel quality measures is a time-averaged value.

In Example 46, the subject matter of Examples 25 to 34 can optionally include wherein the candidate uplink channels are available as part of a multiple uplink carrier channel scheme.

In Example 47, the subject matter of Example 46 can optionally include wherein the candidate uplink channels are available as part of an uplink carrier aggregation scheme according to a Long Term Evolution (LTE) network.

In Example 48, the subject matter of Example 46 can optionally include wherein the candidate uplink channels are available as part of a dual carrier, dual cell, or multiple carrier uplink High Speed Packet Access (HSPA) scheme according to a Universal Mobile Telecommunications System (UMTS) scheme.

Example 49 is a mobile communication terminal device. The mobile communication terminal device includes a data analysis circuit configured to identify first uplink data and second uplink data, wherein the first uplink data has a higher transmission priority than the second uplink data; a channel evaluation circuit configured to evaluate a plurality of candidate uplink channels to generate a plurality of uplink channel quality measures, where each of the plurality of uplink channel quality measures is associated with one of the plurality of candidate uplink channels; a channel selection circuit configured to perform a comparison between one or more of the plurality of uplink channel quality measures to select a first uplink channel from the plurality of candidate uplink channels; and a transmitter configured to transmit the first uplink data using the first uplink channel, and to transmit the second uplink data using a second uplink channel of the plurality of candidate uplink channels.

In Example 50, the subject matter of Example 49 can optionally include wherein the first uplink channel is associated with a higher uplink channel quality measure than the second uplink channel.

In Example 51, the subject matter of Example 49 or 50 can optionally include wherein the first uplink data has a higher transmission priority than the second uplink data based on the type of data contained in the first uplink data and second uplink data.

In Example 52, the subject matter of Examples 49 to 51 can optionally include wherein the channel selection circuit is further configured to select the second uplink channel based on the plurality of uplink channel quality measures.

In Example 53, the subject matter of Example 49 to 51 can optionally include wherein the first uplink data includes one of protocol control signaling data, streaming data, acknowledgement (ACK) messages, or non-acknowledgement (NACK) messages.

In Example 54, the subject matter of Examples 49 to 53 can optionally include wherein the data analysis circuit is further configured to select the first uplink data and second uplink data from a group of uplink data scheduled for uplink transmission.

In Example 55, the subject matter of Example 54 can optionally include wherein the data analysis circuit is further configured to rank each uplink data in the group of uplink data according to transmission priority, wherein the first uplink data is associated with a higher transmission priority than the second uplink data.

In Example 56, the subject matter of Examples 49 to 55 can optionally include wherein the plurality of uplink channel quality measures include at least one of an uplink retransmission rate, downlink retransmission rate, uplink block error rate, downlink block error rate, received signal power, received signal quality, or power headroom.

In Example 57, the subject matter of Example 56 can optionally include a receiver configured to receive data from a base station, wherein the channel evaluation circuit is further configured to calculate the plurality of uplink channel quality measures based on the received data.

In Example 58, the subject matter of Example 56 can optionally include wherein the channel evaluation circuit is further configured to determine a single uplink channel quality measure for each of the plurality of candidate uplink channels.

In Example 59, the subject matter of Example 56 can optionally include wherein the channel evaluation circuit is further configured to determine a plurality of uplink channel quality measures for each of the plurality of candidate uplink channels.

In Example 60, the subject matter of Example 59 can optionally include wherein the channel selection circuit is further configured to rank each of the plurality of candidate uplink channels according to the plurality of uplink channel quality measures associated with each of the plurality of candidate uplink channels.

In Example 61, the subject matter of Example 60 can optionally include wherein the data analysis circuit is further configured to select the first uplink data and second uplink data from a group of uplink data scheduled for uplink transmission; and rank the uplink data in the group of uplink data by transmission priority according to a content of the uplink data, and wherein the transmitter is further configured to transmit each uplink data of the group of uplink data on the highest-ranked available candidate uplink channel of the plurality of candidate uplink channel based on the transmission priority of each uplink data of the group of uplink data.

In Example 62, the subject matter of Example 61 can optionally include wherein the data analysis circuit is configured to rank the uplink data in the group of uplink data by ranking uplink data that includes protocol control signaling, streaming data, and ACK/NACK messages as having a higher transmission priority than other uplink data.

In Example 63, the subject matter of Example 56 can optionally include wherein the mobile communication terminal device is configured to perform uplink mobile communications according to a time division duplex scheme.

In Example 64, the subject matter of Example 63 can optionally include wherein at least one of the plurality of uplink channels shares a common carrier frequency with a downlink channel, and wherein at least one of the plurality of uplink channel quality measures is calculated based on signals received on the downlink channel.

In Example 65, the subject matter of Example 56 can optionally include wherein the mobile communication terminal device is configured to perform uplink mobile communications according to a frequency division duplex scheme, and wherein the uplink channel quality measures include at least one of an uplink retransmission rate, uplink block error rate, or power headroom.

In Example 66, the subject matter of Example 58 can optionally include wherein the channel selection circuit is configured to select the first uplink channel by selecting the candidate uplink channel of the plurality of candidate uplink channels with the highest channel quality measure as the first uplink channel.

In Example 67, the subject matter of Example 49 can optionally include a receiver configured to receive uplink feedback information from a base station, wherein the channel evaluation circuit is further configured to use the uplink feedback information as the plurality of uplink channel quality measures.

In Example 68, the subject matter of Example 67 can optionally include wherein the feedback information includes an uplink signal power or an uplink signal quality measured by the base station.

In Example 69, the subject matter of Examples 49 to 68 can optionally include wherein at least one of the plurality of uplink channel quality measures is a time-averaged value.

In Example 70, the subject matter of Examples 49 to 69 can optionally include wherein the plurality of candidate uplink channels are available as part of a multiple uplink carrier channel scheme.

In Example 71, the subject matter of Example 70 can optionally include wherein the plurality of candidate uplink channels are available as part of an uplink carrier aggregation scheme according to a Long Term Evolution (LTE) network standard.

In Example 72, the subject matter of Example 70 can optionally include wherein the plurality of candidate uplink channels are available as part of a dual carrier, dual cell, or multiple carrier uplink High Speed Packet Access (HSPA) scheme according to a Universal Mobile Telecommunications System (UMTS) network standard.

Example 73 is a mobile communication terminal device. The mobile communication terminal device includes a data analysis circuit configured to identify first uplink data and second uplink data, wherein the first uplink data has a higher transmission priority than the second uplink data; a channel evaluation circuit configured to generate a plurality of uplink channel quality measures based on received data, wherein each of the plurality of uplink channel quality measures represents a channel quality of one of a plurality of candidate uplink channels; a channel selection circuit configured to select a first uplink channel from the plurality of candidate uplink channels based on the plurality of uplink channel quality measures; and a transmitter configured to transmit the first uplink data using the first uplink channel, and transmit the second uplink data using a second uplink channel of the plurality of candidate uplink channels.

In Example 74, the subject matter of Example 73 can optionally include wherein the first uplink channel is associated with a higher uplink channel quality measure than the second uplink channel.

In Example 75, the subject matter of Examples 73 or 74 can optionally include wherein the first uplink data is determined to have a higher transmission priority than the second uplink data based on the type of data contained in the first uplink data and second uplink data.

In Example 76, the subject matter of Examples 73 to 75 can optionally include wherein the channel selection circuit is further configured to select the second uplink channel based on the plurality of uplink channel quality measures.

In Example 77, the subject matter of Examples 73 to 75 can optionally include wherein the first uplink data includes one of protocol control signaling data, streaming data, acknowledgement (ACK) messages, or non-acknowledgement (NACK) messages.

In Example 78, the subject matter of Examples 73 to 77 can optionally include wherein the data analysis circuit is further configured to select the first uplink data and second uplink data from a group of uplink data scheduled for uplink transmission.

In Example 79, the subject matter of Example 78 can optionally include wherein the data analysis circuit is further configured to rank each uplink data in the group of uplink data according to transmission priority, wherein the first uplink data is associated with a higher transmission priority than the second uplink data.

In Example 80, the subject matter of Examples 73 to 79 can optionally include wherein the received data is received from a base station, and wherein the uplink channel quality measures include at least one of an uplink retransmission rate, downlink retransmission rate, uplink block error rate, downlink block error rate, received signal power, received signal quality, or power headroom.

In Example 81, the subject matter of Example 80 can optionally include wherein the uplink channel quality measure is calculated based on the received data.

In Example 82, the subject matter of Example 80 can optionally include wherein the channel evaluation circuit is further configured to determine a single uplink channel quality measure for each of the plurality of candidate uplink channels based on the received data.

In Example 83, the subject matter of Example 80 can optionally include wherein the channel evaluation circuit is further configured to determine a plurality of uplink channel quality measures for each of the plurality of candidate uplink channels based on the received data.

In Example 83, the subject matter of Example 83 can optionally include wherein the channel selection circuit is further configured to rank each of the plurality of candidate uplink channels according to the plurality of uplink channel quality measures associated with each of the plurality of candidate uplink channels.

In Example 85, the subject matter of Example 84 can optionally include wherein the data analysis circuit is further configured to select the first uplink data and second uplink data from a group of uplink data scheduled for uplink transmission; and rank the uplink data in the group of uplink data by transmission priority according to a content of the uplink data, and wherein the transmitter is further configured to transmit each uplink data of the group of uplink data on the highest-ranked available candidate uplink channel of the plurality of candidate uplink channel based on the transmission priority of each uplink data of the group of uplink data.

In Example 86, the subject matter of Example 85 can optionally include wherein the data analysis circuit is further configured to rank uplink data that includes protocol control signaling, streaming data, and ACK/NACK messages as having a higher transmission priority than other uplink data.

In Example 87, the subject matter of Example 80 can optionally include wherein the mobile communication terminal device is configured to perform uplink mobile communications according to a time division duplex scheme.

In Example 88, the subject matter of Example 87 can optionally include wherein at least one of the plurality of uplink channels shares a common carrier frequency with a downlink channel, and wherein the received data is received over the downlink channel.

In Example 89, the subject matter of Example 80 can optionally include wherein the mobile communication terminal device is configured to perform uplink mobile communications according to a frequency division duplex scheme, and wherein the uplink channel quality measures include at least one of an uplink retransmission rate, uplink block error rate, or power headroom.

In Example 90, the subject matter of Example 73 can optionally include wherein the channel selection circuit is configured to select the first uplink channel by selecting the candidate uplink channel of the plurality of candidate uplink channels with the highest channel quality measure as the first uplink channel.

In Example 91, the subject matter of Example 73 can optionally include a receiver configured to receive uplink feedback information from a base station, wherein the channel evaluation circuit is further configured to use the uplink feedback information as the plurality of uplink channel quality measures.

In Example 92, the subject matter of Example 91 can optionally include wherein the uplink feedback information includes an uplink signal power or an uplink signal quality measured by the base station.

In Example 93, the subject matter of Examples 73 to 92 can optionally include wherein at least one of the plurality of uplink channel quality measures is a time-averaged value.

In Example 94, the subject matter of Examples 73 to 93 can optionally include wherein the plurality of candidate uplink channels are available as part of a multiple uplink carrier channel scheme.

In Example 95, the subject matter of Example 94 can optionally include wherein the plurality of candidate uplink channels are available as part of an uplink carrier aggregation scheme according to a Long Term Evolution (LTE) network standard.

In Example 96, the subject matter of Example 94 can optionally include wherein the plurality of candidate uplink channels are available as part of a dual carrier, dual cell, or multiple carrier uplink High Speed Packet Access (HSPA) scheme according to a Universal Mobile Telecommunications System (UMTS) network standard.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A user equipment device comprising:
   a data analysis circuit configured to identify a plurality of uplink data comprising a first uplink data, a second uplink data, and a third uplink data, wherein the first uplink data has a higher transmission priority than the second uplink data, and the third uplink data has a lower transmission priority than the second uplink data; and wherein transmission priority is based on a type of data contained in each of the respective uplink data;
   a carrier analysis circuit configured to generate a plurality of uplink carrier channel quality measures based on a plurality of candidate uplink carrier channels, wherein the plurality of uplink carrier channel quality measures comprise at least a power head room; and wherein at least one of the plurality of candidate uplink carrier channels shares a common carrier frequency with a downlink carrier channel;
   a carrier channel selection circuit configured to perform a comparison between one or more of the plurality of uplink carrier channel quality measures to select a first uplink carrier channel from the plurality of candidate uplink carrier channels; and
   a transmitter configured to transmit the first uplink data using the first uplink carrier channel, and to transmit the third uplink data using a second uplink carrier channel of the plurality of candidate uplink carrier channels, wherein the first uplink data and the third uplink data are transmitted during a first time period; and
   wherein the transmitter is further configured to transmit the second uplink data using the first uplink carrier channel during a second time period.

2. The user equipment device of claim 1, wherein the first uplink data comprises one of protocol control signaling data, streaming data, acknowledgement (ACK) messages, or non-acknowledgement (NACK) messages.

3. The user equipment device of claim 1, further comprising:
   a receiver configured to receive data from a base station, wherein the carrier analysis circuit is further configured to:
   calculate the plurality of uplink carrier channel quality measures based on the received data.

4. The user equipment device of claim 1, wherein the user equipment device is configured to perform uplink mobile communications according to a frequency division duplex scheme, and wherein the uplink carrier channel quality measures comprise at least one of an uplink retransmission rate or uplink block error rate.

5. The user equipment device of claim 1, further comprising:
   a receiver configured to receive uplink feedback information from a base station, wherein the carrier analysis circuit is further configured to use the uplink feedback information as the plurality of uplink carrier channel quality measures.

6. The user equipment device of claim 1, wherein the plurality of candidate uplink carrier channels are available as part of a multiple uplink carrier channel scheme.

7. The user equipment device of claim 1, wherein each of the plurality of candidate uplink carrier channels is an independent channel with a distinct carrier frequency.

8. The user equipment device of claim 1, wherein the plurality of uplink data further comprises a fourth uplink data, wherein the fourth uplink data has a lower transmission priority than the third uplink data; and
   wherein the transmitter is further configured to transmit the fourth uplink data using the second uplink carrier channel during the second time period.

9. A method for performing uplink mobile communications comprising:
  prioritizing a first uplink data, a second uplink data, and a third uplink data, wherein the first uplink data has a higher transmission priority than the second uplink data and the second uplink data has a higher transmission priority than the third uplink data; and wherein transmission priority is based on a type of data contained in each of the respective uplink data;
  generating a plurality of uplink carrier channel quality measures based on a plurality of candidate uplink carrier channels, wherein the plurality of uplink carrier channel quality measures comprise at least a power head room; and wherein at least one of the plurality of candidate uplink carrier channels shares a common carrier frequency with a downlink carrier channel;
  performing a comparison between one or more of the plurality of uplink carrier channel quality measures to select a first uplink carrier channel from the plurality of candidate uplink carrier channels;
  transmitting the first uplink data using the first uplink carrier channel; and
  transmitting the third uplink data using a second uplink carrier channel of the plurality of candidate uplink carrier channels, wherein the first uplink data and the third uplink data are transmitted during a first time period; and
  transmitting the second uplink data using the first uplink carrier channel during a second time period; and
  wherein the method occurs within a user equipment device.

10. The method of claim 9, wherein the uplink mobile communications are performed according to a frequency division duplex scheme, and wherein the uplink carrier channel quality measures comprise at least one of an uplink retransmission rate or uplink block error rate.

11. The method of claim 9, wherein the candidate uplink carrier channels are available as part of a multiple uplink carrier channel scheme.

12. The method of claim 9, wherein the first uplink data comprises one of protocol control signaling data, streaming data, acknowledgement (ACK) messages, or non-acknowledgement (NACK) messages.

13. The method of claim 9, wherein each of the plurality of candidate uplink carrier channels is an independent channel with a distinct carrier frequency.

14. A user equipment device comprising:
  a data analysis circuit configured to identify a first uplink data, a second uplink data, and a third uplink data, wherein the first uplink data has a higher transmission priority than the second uplink data and the second uplink data has a higher transmission priority than the third uplink data, and wherein transmission priority is based on uplink data content;
  a carrier analysis circuit configured to generate a plurality of uplink carrier channel quality measures based on received data, wherein each of the plurality of uplink carrier channel quality measures represents a carrier channel quality of one of a plurality of candidate uplink carrier channels; wherein the plurality of uplink carrier channel quality measures comprise at least a power head room; and wherein at least one of the plurality of candidate uplink carrier channels shares a common carrier frequency with a downlink carrier channel;
  a carrier channel selection circuit configured to select a first uplink carrier channel from the plurality of candidate uplink carrier channels based on the plurality of uplink carrier channel quality measures; and
  a transmitter configured to transmit the first uplink data using the first uplink carrier channel, and transmit the third uplink data using a second uplink carrier channel of the plurality of candidate uplink carrier channels, wherein the first uplink data and the third uplink data are transmitted during a first time period; and
  the transmitter further configured to transmit the second uplink data using the first uplink carrier channel during a second time period.

15. The user equipment device of claim 14, wherein the first uplink data comprises one of protocol control signaling data, streaming data, acknowledgement (ACK) messages, or non-acknowledgement (NACK) messages.

16. The user equipment device of claim 14, wherein the data analysis circuit is further configured to:
  select the first uplink data and second uplink data from a group of uplink data scheduled for uplink transmission.

17. The user equipment device of claim 16, wherein the data analysis circuit is further configured to:
  rank each uplink data in the group of uplink data according to transmission priority, wherein the first uplink data is associated with a higher transmission priority than the second uplink data.

18. The user equipment device of claim 14, wherein the carrier channel selection circuit is configured to select the first uplink carrier channel by: selecting a candidate uplink carrier channel of the plurality of a candidate uplink carrier channels with the highest carrier channel quality measure as the first uplink carrier channel.

19. The user equipment device of claim 14, wherein each of the plurality of candidate uplink carrier channels is an independent channel with a distinct carrier frequency.

20. The user equipment device of claim 14, wherein the user equipment device is configured to perform uplink mobile communications according to a frequency division duplex scheme, and wherein the uplink carrier channel quality measures comprise at least one of an uplink retransmission rate, or uplink block error rate.

* * * * *